US012666141B2

(12) United States Patent
Hogyoku

(10) Patent No.: US 12,666,141 B2
(45) Date of Patent: Jun. 23, 2026

(54) PHOTODETECTION APPARATUS AND ELECTRONIC EQUIPMENT

(71) Applicant: Sony Semiconductor Solutions Corporation, Atsugi (JP)

(72) Inventor: Susumu Hogyoku, Atsugi (JP)

(73) Assignee: Sony Semiconductor Solutions Corporation, Atsugi (JP)

( * ) Notice: Subject to any disclaimer, the term of this patent is extended or adjusted under 35 U.S.C. 154(b) by 0 days.

(21) Appl. No.: 18/835,039

(22) PCT Filed: Feb. 20, 2023

(86) PCT No.: PCT/JP2023/005917
§ 371 (c)(1),
(2) Date: Aug. 1, 2024

(87) PCT Pub. No.: WO2023/171333
PCT Pub. Date: Sep. 14, 2023

(65) Prior Publication Data
US 2025/0159333 A1 May 15, 2025

(30) Foreign Application Priority Data

Mar. 8, 2022 (JP) ................................. 2022-035042

(51) Int. Cl.
*H04N 23/60* (2023.01)
*H04N 25/779* (2023.01)
(52) U.S. Cl.
CPC ........... *H04N 23/64* (2023.01); *H04N 23/665* (2023.01); *H04N 25/779* (2023.01)

(58) Field of Classification Search
CPC ...... G06N 3/049; G06N 3/063; G06T 1/0007; H04N 23/64; H04N 23/665; H04N 23/80; H04N 25/443; H04N 25/779; H04N 25/79
See application file for complete search history.

(56) References Cited

U.S. PATENT DOCUMENTS

| | | | | |
|---|---|---|---|---|
| 10,939,028 | B2 * | 3/2021 | Wexler | ................. G06V 40/172 |
| 11,039,053 | B2 * | 6/2021 | Wexler | ................ G10L 15/1822 |
| 12,450,473 | B1 * | 10/2025 | Xiao | ....................... G06N 3/063 |
| 2019/0325250 | A1 | 10/2019 | Bobda | |

(Continued)

FOREIGN PATENT DOCUMENTS

| | | |
|---|---|---|
| JP | 2019-204492 A | 11/2019 |
| JP | 2022-511414 A | 1/2022 |

OTHER PUBLICATIONS

International Search Report and Written Opinion mailed on May 16, 2023, received for PCT Application PCT/JP2023/005917, filed on Feb. 20, 2023, 10 pages including English Translation.

*Primary Examiner* — Antoinette T Spinks
(74) *Attorney, Agent, or Firm* — XSENSUS LLP

(57) ABSTRACT

The present disclosure relates to a photodetection apparatus and electronic equipment that are allowed to achieve increased efficiency. Bidirectional communication between an image sensor provided with a pixel group including N pixels from among a plurality of pixels arranged on a sensor surface in an array and a processor in which a neural network is formed by a neuron group with M neurons is performed by a group interface provided between the image sensor and the processor. The present technology can be applied to, for example, a stacked CMOS image sensor.

20 Claims, 26 Drawing Sheets

(56) References Cited

U.S. PATENT DOCUMENTS

| | | | | |
|---|---|---|---|---|
| 2020/0051271 A1* | 2/2020 | Wexler | .................. | G06V 40/28 |
| 2020/0053262 A1* | 2/2020 | Wexler | .................. | G06V 20/30 |
| 2020/0195875 A1 | 6/2020 | Berkovich | | |
| 2021/0264679 A1 | 8/2021 | Liu | | |

* cited by examiner

F I G . 3
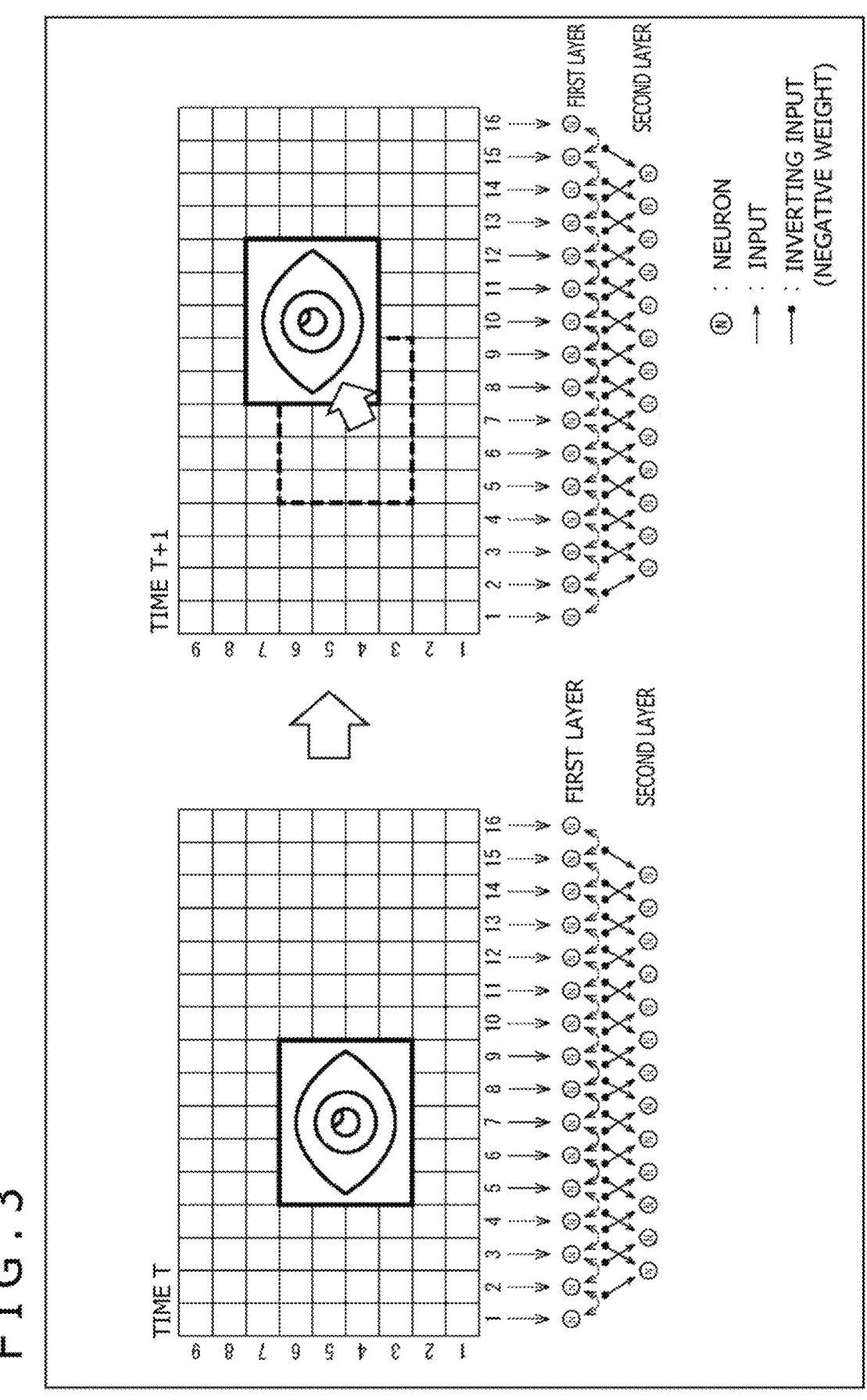

F I G . 6
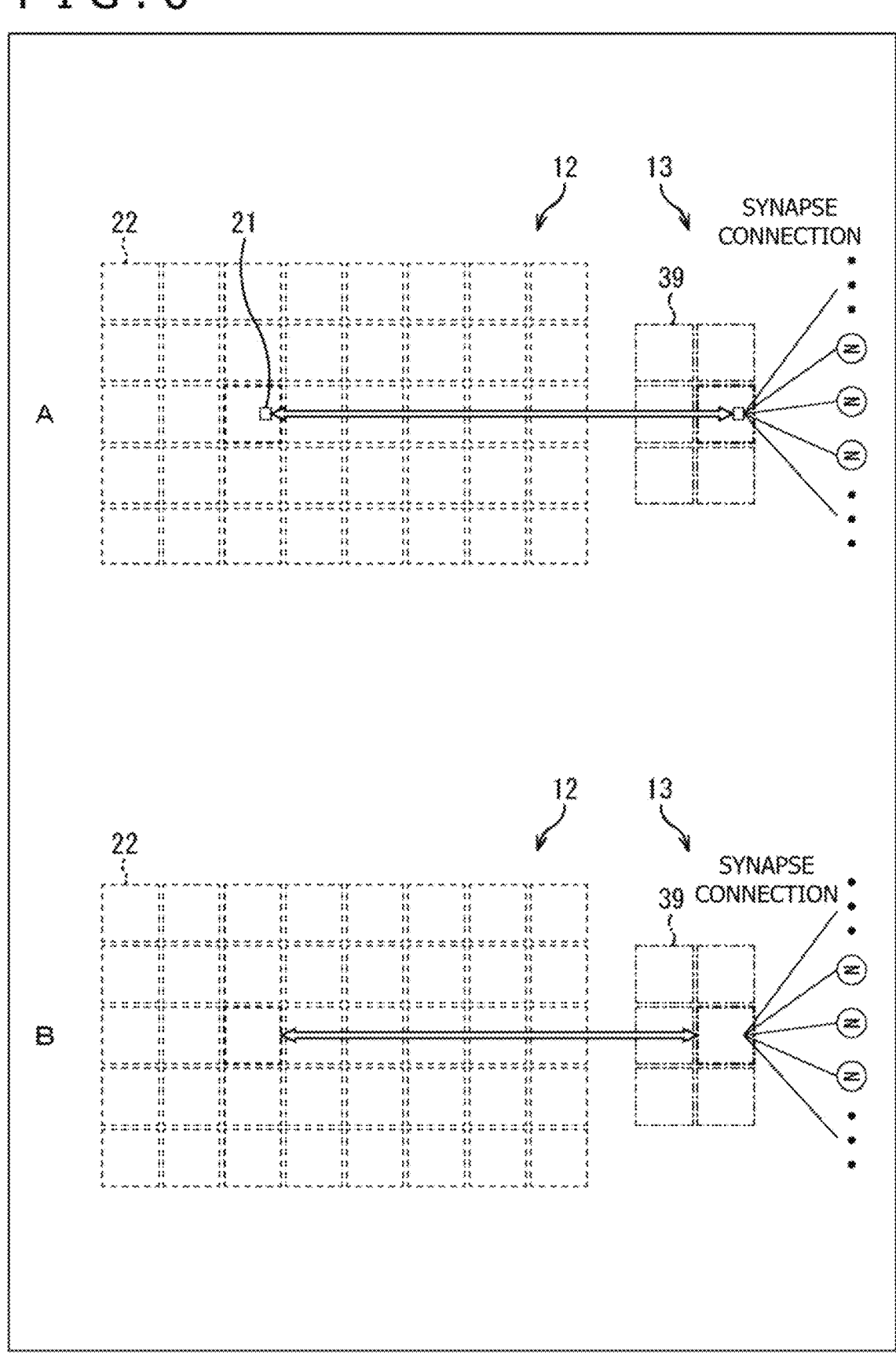

F I G . 7
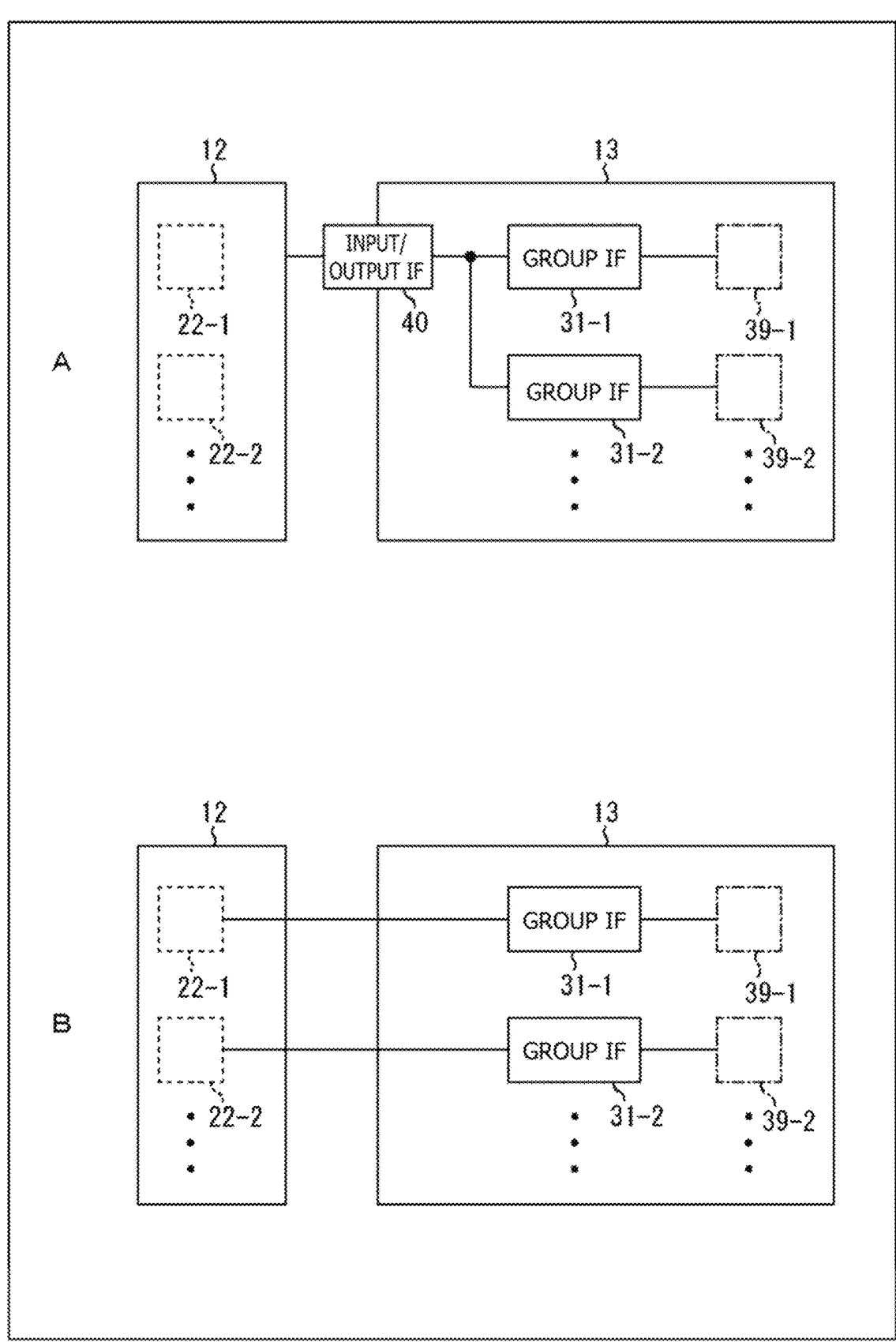

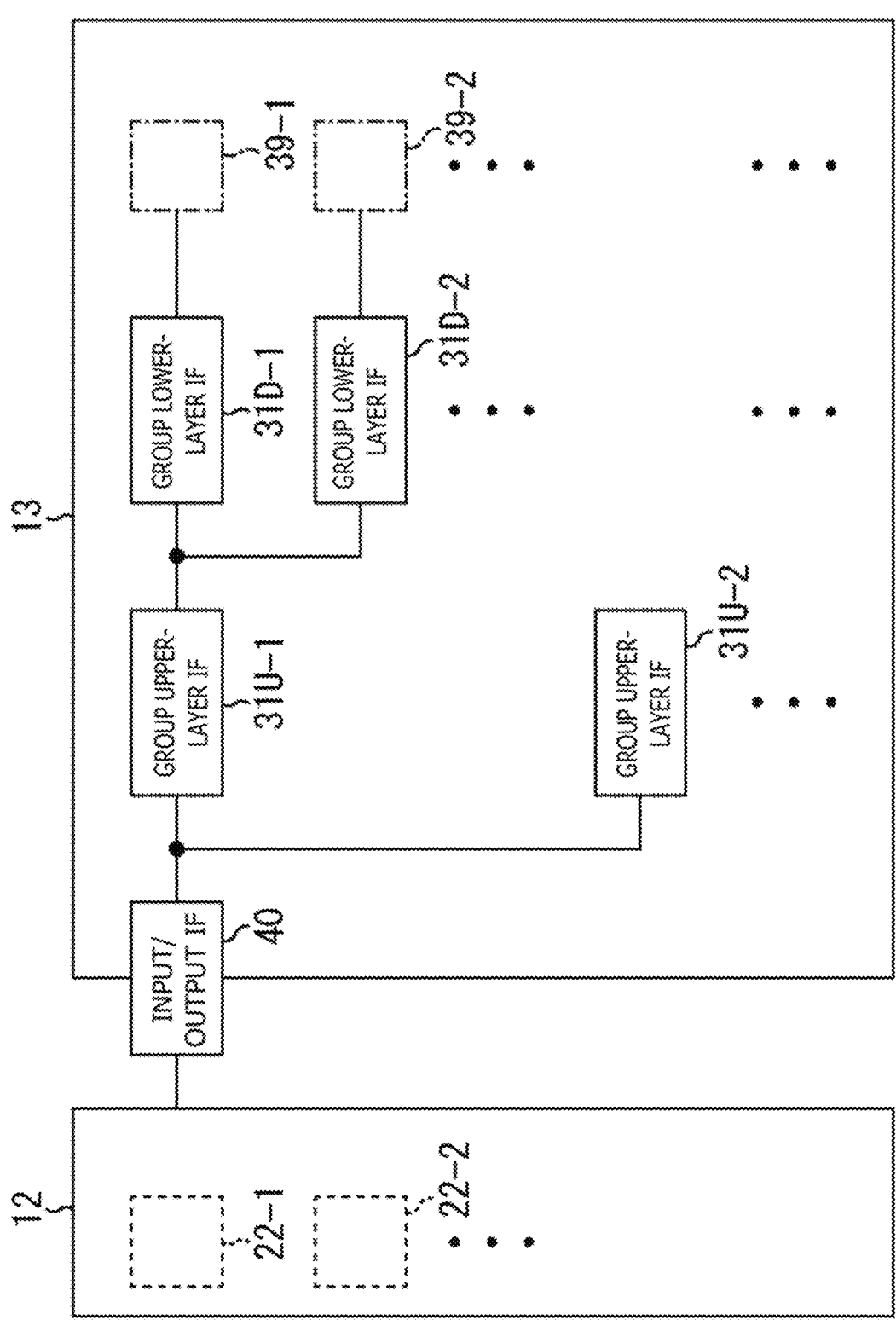
F I G . 8

F I G . 1 5
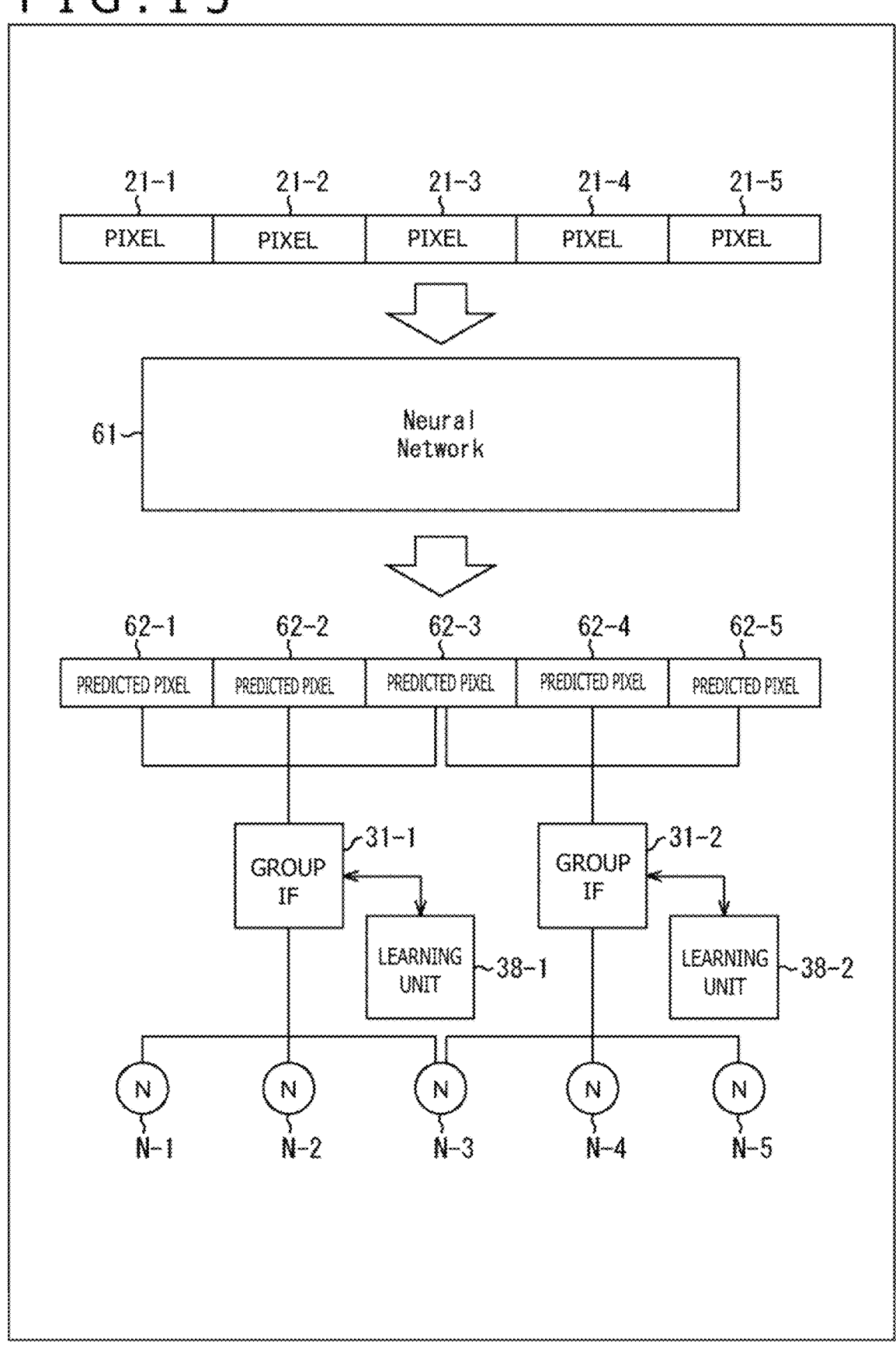

F I G . 1 7
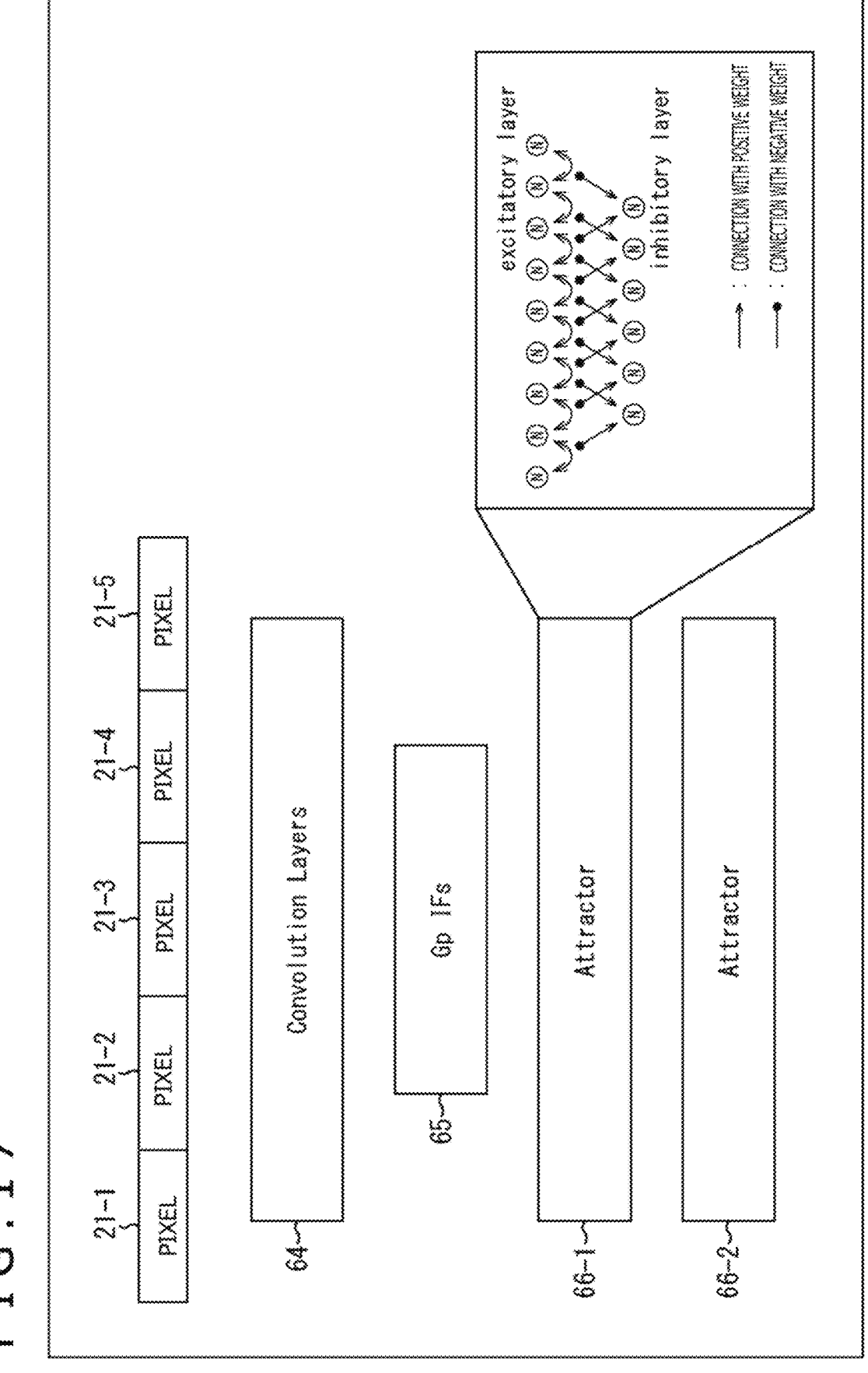

F I G . 2 2
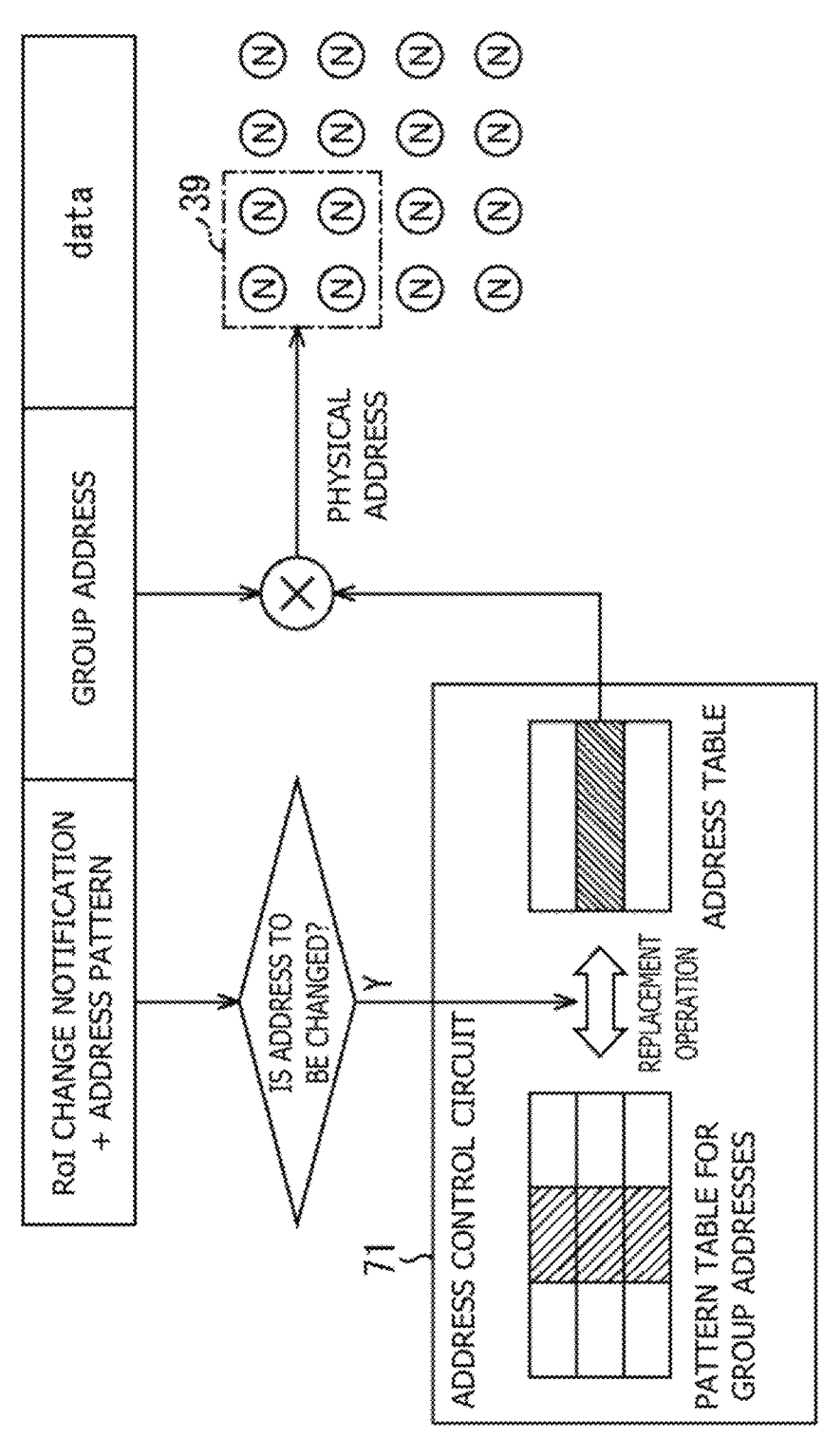

FIG.23

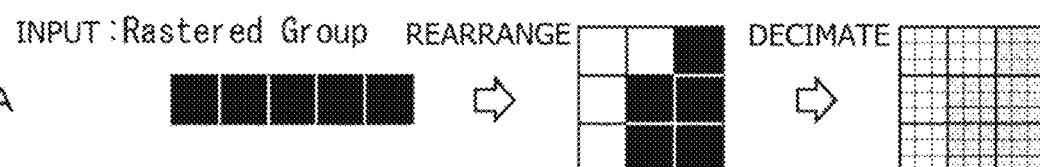

INPUT : Rastered Group    REARRANGE          DECIMATE

A

ALIGN WITH NEURON ARRANGEMENT
(□ : NO DATA  ■ : DATA )

B

FOR ONE RoI
1-bit          HAS SIZE OF RoI BEEN CHANGED?
--bit          attr
$Log_2N$ bit          LENGTH OF SIDE OF NEW RoI
                (UNNECESSARY IN CASE WHERE DATA HAS SQUARE ARRANGEMENT)

$2 \times Log_2N$ bit          COORDINATES OF START POINT GROUP
                 (UNNECESSARY IN CASE WHERE DATA HAS SQUARE ARRANGEMENT)
data          [rastered group]

C

FOR PLURALITY OF RoIs
[
  1-bit          HAS SIZE OF RoI BEEN CHANGED?
  --bit          attr
  $Log_2N$ bit          LENGTH OF SIDE OF NEW RoI
  $2 \times Log_2N$ bit          COORDINATES OF START POINT GROUP
  k bit          RoI NUMBER (WANT)
]
data          [rastered group]

*BASE OF Log IS 2
          *k=$Log_2$(NUMBER OF RoIs)

FIG. 24

PHOTODETECTION APPARATUS AND ELECTRONIC EQUIPMENT

CROSS-REFERENCE TO RELATED APPLICATIONS

The present application is based on PCT filing PCT/JP2023/005917, filed Feb. 20, 2023, which claims priority from Japanese Patent Application No. 2022-035042, filed Mar. 8, 2022, the entire contents of each are incorporated herein by reference.

TECHNICAL FIELD

The present disclosure relates to a photodetection apparatus and electronic equipment, and in particular, to a photodetection apparatus and electronic equipment that is allowed to achieve increased efficiency.

BACKGROUND ART

In recent years, for image processing systems using a neural network, functionality and applicability have been increasingly extended, whereas there has been room for improvement in terms of processing speed and power.

For example, PTL 1 proposes that, in a configuration including pieces of hardware designed for a neural network and arranged in parallel and in a hierarchical manner, increasing efficiency is achieved by driving only computing units that have generated signals.

CITATION LIST

Patent Literature

[PTL 1]
Japanese Patent Laid-Open No. 2019-204492

SUMMARY

Technical Problem

However, in PTL 1, only the hardware designed for a neural network is adapted to increase efficiency, whereas an increase in the efficiency of the whole image processing system including an image sensor is not taken into account. Accordingly, increased efficiency of the whole image processing system including an image sensor has been demanded.

The present disclosure has been made in view of these circumstances, and an object of the present disclosure is to allow increased efficiency to be achieved.

Solution to Problem

According to an aspect of the present disclosure, a photodetection apparatus includes an image sensor provided with a pixel group including N (N is an positive integer) pixels from among a plurality of pixels arranged on a sensor surface in an array, a processor in which a neural network is formed by a neuron group with M (M is a positive integer) neurons, and a group interface provided between the pixel group and the neuron group and performing bidirectional communication between the image sensor and the processor.

According to an aspect of the present disclosure, electronic equipment includes an image sensor provided with a pixel group including N (N is an positive integer) pixels from among a plurality of pixels arranged on a sensor surface in an array, a processor in which a neural network is formed by a neuron group with M (M is a positive integer) neurons, and a group interface provided between the pixel group and the neuron group and performing bidirectional communication between the image sensor and the processor.

According to an aspect of the present disclosure, bidirectional communication between an image sensor provided with a pixel group including N pixels from among a plurality of pixels arranged on a sensor surface in an array and a processor in which a neural network is formed by a neuron group with M neurons is performed by a group interface provided between the image sensor and the processor.

BRIEF DESCRIPTION OF DRAWINGS

FIG. 3 is a diagram for describing an example in which a region-of-interest is extracted.

FIG. 6 depicts diagrams for describing processing of accumulating learning information on a per-pixel or per-pixel-group basis.

FIG. 7 depicts diagrams illustrating connection configuration examples of group IFs.

FIG. 8 is a diagram illustrating a connection configuration example of group IFs configured in a hierarchical structure.

FIG. 15 is a diagram illustrating a second configuration example of a network configuration.

FIG. 17 is a diagram illustrating a fourth configuration example of a network configuration.

FIG. 22 is a diagram for describing address conversion processing.

FIG. 23 depicts diagrams illustrating an example of a notification of a change in the region-of-interest.

FIG. 24 is a diagram for describing a network for post-processing.

DESCRIPTION OF EMBODIMENT

A specific embodiment to which the present technology is applied will be described below in detail with reference to the drawings.

<Configuration Example of Solid-State Imaging Device>

Figure 1:
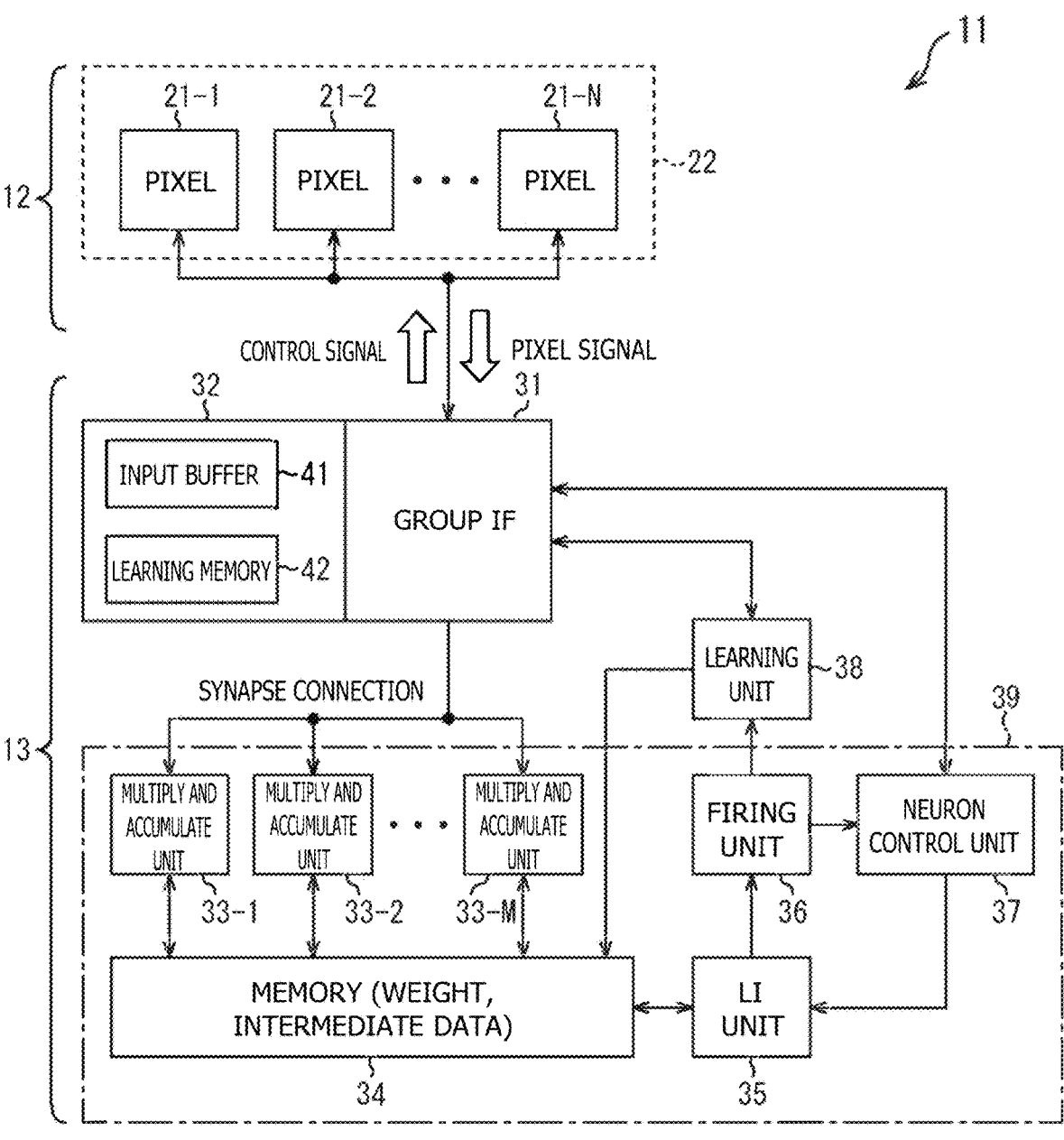
FIG. 1 is a block diagram illustrating a configuration example of an embodiment of a photodetection apparatus to which the present technology is applied.

FIG. 1 is a block diagram illustrating a configuration example of an embodiment of a solid-state imaging device that is an example of a photodetection apparatus to which the present technology is applied.

A solid-state imaging device 11 illustrated in FIG. 1 has a stacked structure in which an image sensor 12 and a neural network processor 13 are stacked, and the image sensor 12 and the neural network processor 13 can communicate bidirectionally. That is, the image sensor 12 inputs data (for example, a pixel signal) to the neural network processor 13, and the neural network processor 13 outputs data (for example, a control signal) to the image sensor 12.

The image sensor 12 is a back-illuminated CMOS (Complementary Metal Oxide Semiconductor) image sensor and includes a plurality of pixels 21 arranged on a sensor surface in an array. In addition, in the image sensor 12, a predetermined number of pixels 21 constitute a pixel group 22, and in an illustrated example, N pixels 21-1 to 21-N constitute the pixel group 22.

The neural network processor 13 includes a group IF (Interface) 31, an accumulation section 32, a plurality of multiply and accumulate units 33, a memory 34, an LI (Leaky Integrate) unit 35, a firing unit 36, a neuron control unit 37, and a learning unit 38. In addition, in the neural network processor 13, a predetermined number of multiply and accumulate units 33, the LI unit 35, the firing unit 36, and the neuron control unit 37 constitute a neuron group 39. For example, the neuron group 39 including M multiply and accumulate units 33-1 to 33-M constitutes a neural network with M neurons synaptically connected together.

As illustrated, in the solid-state imaging device 11, the pixel group 22 and the neuron group 39 are connected via the group IF 31. In the solid-state imaging device 11, a plurality of pixel groups 22 provided in the image sensor 12 is connected via the group IF 31 to a plurality of neuron groups 39 provided in the neural network processor 13 in such a manner that each of the pixel groups 22 is connected to a corresponding one of the neuron groups 39.

The group IF 31 can perform bidirectional communication between the image sensor 12 and the neural network processor 13. The group IF 31 performs data transmission and reception as well as addressing and can, for example, receive communication of spike information between neurons, decode the spike information into a required format, and deliver the decoded spike information to the individual neurons. Note that a method for addressing will be described below with reference to FIGS. 20 to 23.

When the group IF 31 transmits or receives data to or from the image sensor 12, the accumulation section 32 temporarily accumulates the data. For example, the accumulation section 32 accumulates, in an input buffer 41, data to be input to the neural network processor 13 from the image sensor 12, and accumulates, in a learning memory 42, learning information fed from the learning unit 38.

The multiply and accumulate unit 33 performs a multiply and accumulate operation between data fed via the group IF 31 and weights stored in the memory 34 and stores, in the memory 34, intermediate data obtained in the middle of the multiple and accumulate operation.

The memory 34 stores weights and intermediate data required for the multiply and accumulate unit 33 to perform a multiple and accumulate operation.

The LI unit 35 uses the intermediate data of each neuron as an input to perform leaky integrate on the basis of the result of the multiple and accumulate operation. For example, the LI unit 35 differentiates the firing rates of neurons or performs an operation corresponding to the differential and feeds the result of the operation to the firing unit 36. For example, the LI unit 35 can perform the operation corresponding to the differential, using at least any one of a leaky integrate value for the number of firings and a membrane potential that will be described below with reference to FIG. 12. Alternatively, the LI unit 35 can make flow estimation of the firing rates of neurons described below with reference to FIG. 13 (the time moving rate of the firing rate that is the differential, in a spatial direction, of the spatial distribution of the firing rates of neurons) using the operation corresponding to the differential.

On a per-neuron basis, in a case where the intermediate data determined by each neuron exceeds a predetermined threshold on the basis of the result of the operation fed from the LI unit 35, the firing unit 36 detects the firing of the neuron exceeding the threshold, and determines whether to output a signal to the following synapse.

The neuron control unit 37 controls the LI unit 35 on the basis of the firing of the neuron detected by the firing unit 36.

On the basis of an input signal and a firing signal or the intermediate data value, the learning unit 38 performs a predetermined operation (for example, the leaky integrate operation may be used) and updates weights used by the respective multiply and accumulate units 33-1 to 33-M to execute the multiply and accumulate operation. In addition, learning information (learning signal) output to the group IF 31 by the learning unit 38 is determined on the basis of the firing rates of neurons as described below with reference to FIG. 12 or FIG. 13. The learning information is accumulated in the learning memory 42 over time.

In the solid-state imaging device 11 configured as described above, the image sensor 12 and the neural network processor 13 communicate bidirectionally to allow the results of processing executed in the neural network processor 13 to be used to control the properties of the pixels 21 in the image sensor 12. Thus, regardless of whether output from the image sensor 12 is synchronous or asynchronous, the solid-state imaging device 11 can improve controllability of input and output between the image sensor 12 and the neural network processor 13, and for example, it is possible to achieve an increase in the efficiency of power consumption and the like.

For example, the neural network processor 13 receives input from the image sensor 12 and sorts the input into a plurality of neurons via synapses. Therefore, each neuron receives an indefinite amount of signals from a plurality of synapses, and thus, for the neurons for which the amount of signals exceeds a predetermined value, a wait to access the memory 34 (Lock processing), that is, excessive input to the neural network processor 13 may occur. As a result, a possible increase in the amount of memory required to buffer input, the need to discard the input the amount of which exceeds a defined value, or the like may have been generated in the related art.

In contrast, the solid-state imaging device 11 can control the amount of input by transmitting a control signal instructing the image sensor 12, used as an input source, to adjust the amount of signals. This enables, for example, avoidance of concentration of input on particular multiply and accumulate units 33, thereby preventing processing latency, that is, a wait to access the memory 34. Thus, the solid-state imaging device 11 can achieve increased efficiency, compared to the related art. For example, such a control signal can be determined on the basis of the operation of the learning unit 38.

Figure 2:
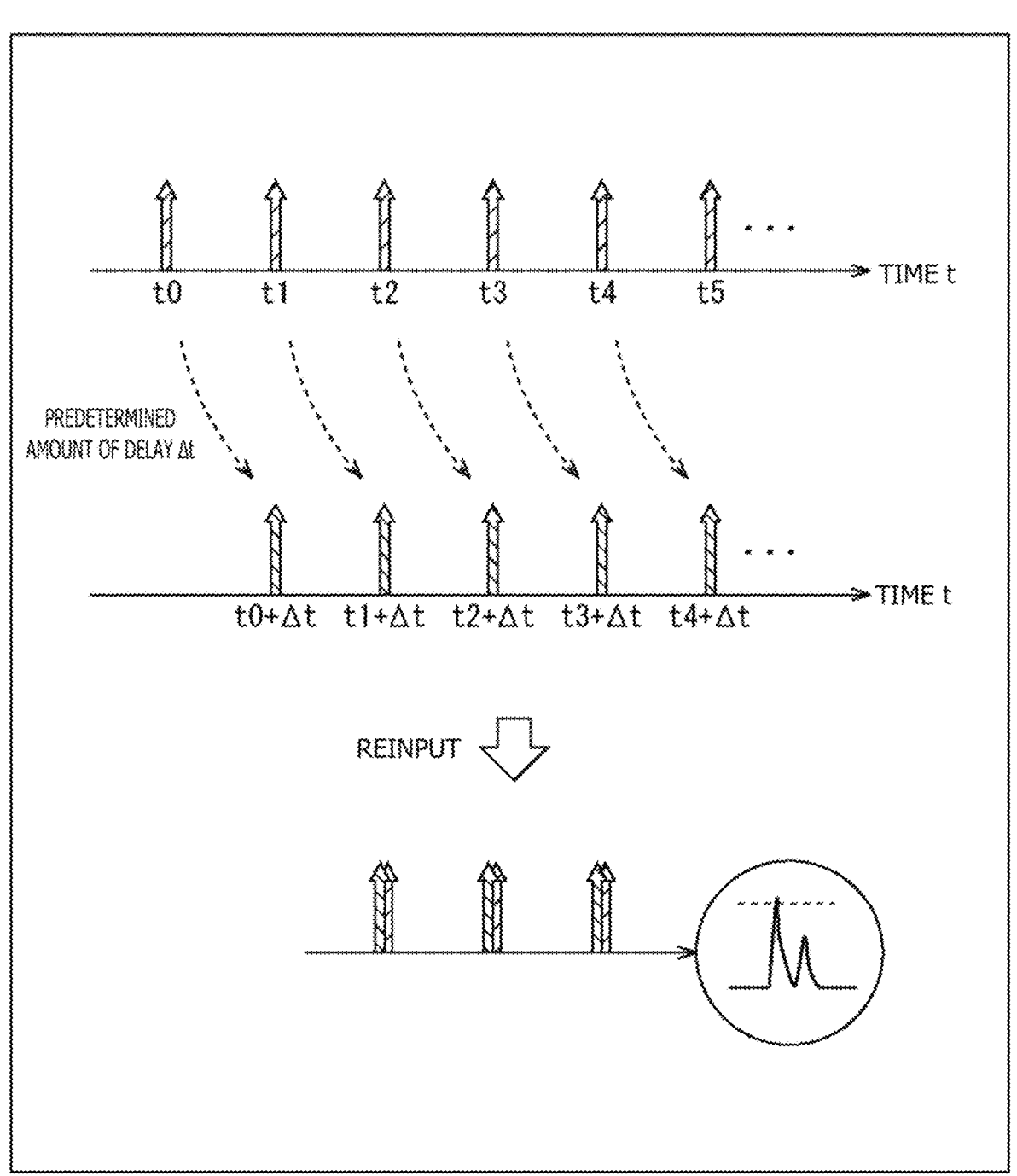
FIG. 2 is a diagram for describing processing of detecting a pixel signal with a fixed, temporally periodic pattern.

With reference to FIG. 2, processing will be described in which the neural network processor 13 detects a pixel signal with a fixed temporal periodic pattern. For example, this processing is effective when the output from the image sensor 12 is asynchronous.

FIG. 2 illustrates a pixel signal with a fixed temporal periodic pattern as an example of the pixel signal input to a certain synapse.

In the neural network processor 13, the group IF 31 can apply a predetermined amount of delay $\Delta t$ to the pixel signal input to a certain multiply and accumulate unit 33, and reinput the processed pixel signal to the same multiply and accumulate unit 33. Then, when the pixel signals overlap, in other words, the interval between the periodic patterns of the pixel signal matches the amount of delay $\Delta t$, the intermediate data determined by the multiply and accumulate unit 33 is more likely to rise, increasing a firing probability.

As described above, in the neural network processor 13, when the pixel signal is reinput with the amount of delay $\Delta t$ approximately matching the periodic pattern of the pixel signal input to a certain neuron, the amount of instantaneous input to the neuron appears to increase. This increases the firing probability, enabling associated enhancement of the learning signal to be observed.

As a result, the neural network processor 13 easily detects pixel signals with a fixed periodic pattern, for example, a blinking signal and a flicker light source, and can communicate detection of such a pixel signal to the image sensor 12. Note that the processing for reinputting the pixel signal may lead to excessive input to the multiply and accumulate unit 33 but that the above-described control of the amount of input allows the excessive input to the multiply and accumulate unit 33 to be efficiently eliminated.

With reference to FIG. 3, processing will be described in which the neural network processor 13 detects a predetermined spatial pattern.

On the basis of a heat map in which the firing rates of active neurons are mapped, the neural network processor 13 can detect, as a region-of-interest, a predetermined spatial pattern appearing in an image captured by the image sensor 12.

FIG. 3 illustrates an example of processing in which the "human eye" appearing in an image captured by the image sensor 12 is detected as a region-of-interest that is tracked. As illustrated in FIG. 3, solid arrows represent regions with active input from the image sensor 12, neurons in a first layer are subjected to bidirectional connections to peripheral neurons including recursive connections, and neurons in a second layer are bidirectionally and fully connected to the neurons in the first layer.

The neurons N in the first layer act to repeat recursive input in such a manner as to maintain firing around regions with much input. The neurons N in the second layer more strongly suppresses the firing maintaining action of the neurons N in the first layer as the general firing rate increases, and produces an effect similar to denoising.

A region corresponding to an active portion of the heat map is determined to be an ROI (Region-of-Interest), and the sensor output in the regions other than the region-of-interest is suppressed, and for example, the pixels in the regions other than the region-of-interest are set into a standby state, enabling an increase in the efficiency of power and the like. In other words, for the region-of-interest, the presence of output can be controlled for each pixel 21 or for each pixel group 22 on the basis of information that many firings occur in the region-of-interest.

In the example illustrated in FIG. 3, at time T, active input from pixel signals that are output from the fifth to ninth pixels according to the region-of-interest is observed. At time T+1, active input from pixel signals that are output from the eighth to twelfth pixels according to the region-of-interest after movement is observed. The region-of-interest can be determined or changed (tracked). Then, the pixels other than those in the region-of-interest can be set into the standby state.

Note that FIG. 3 illustrates only a uniaxial network for convenience and that the neural network processor 13 implements a biaxial network and can thus two-dimensionally track the region-of-interest.

Here, such a structure depicted in FIG. 4 corresponds to more accurate illustration of a neural network model (Attractor) in FIG. 3 (as in FIG. 17 and FIG. 24 described below).

Figure 4:
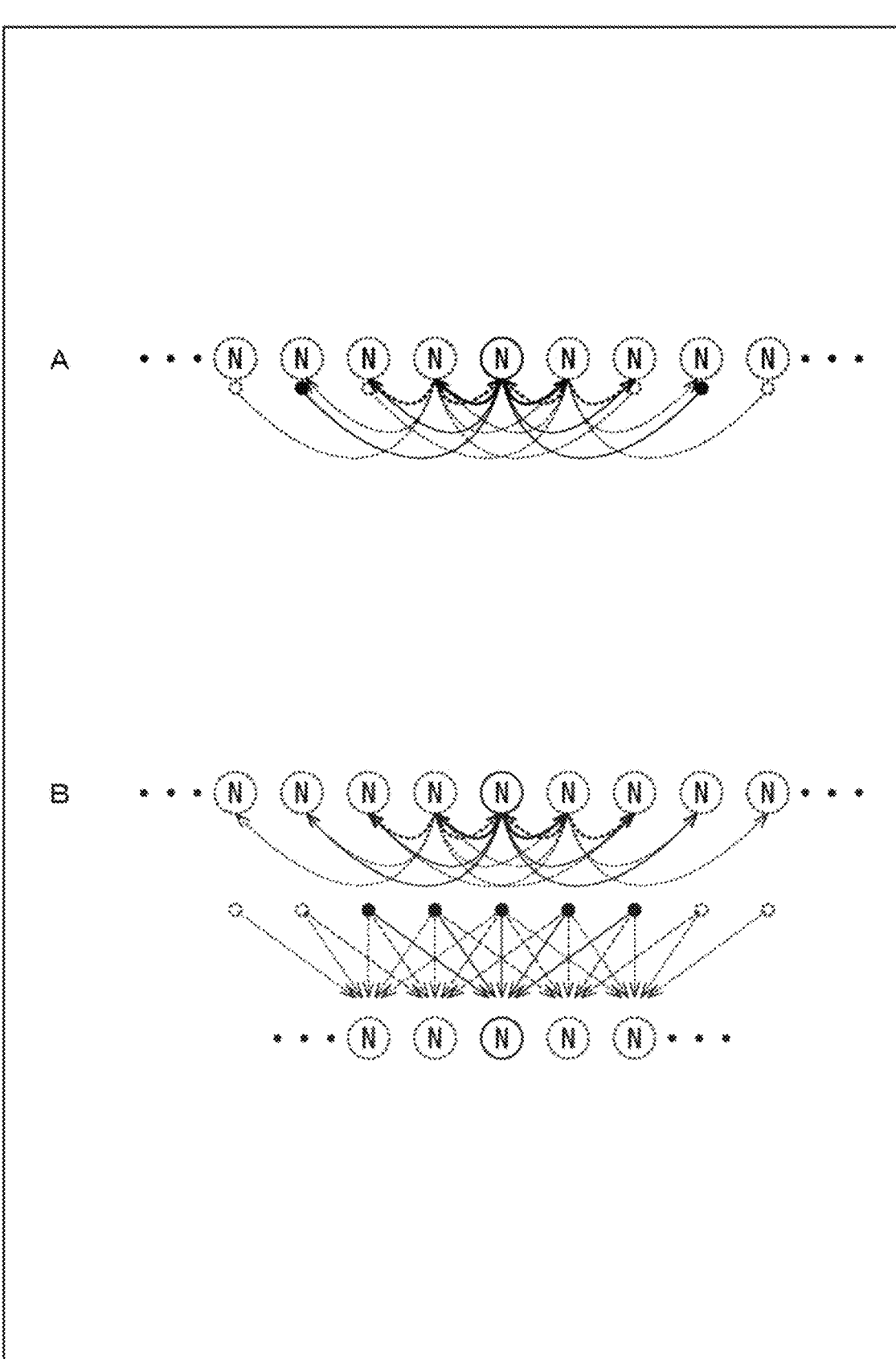
FIG. 4 depicts diagrams for describing a neutral network model.

A of FIG. 4 illustrates a neural network model using only the first layer. As illustrated, in the neural network model, connections from each of all neurons N to several peripheral neurons of the neuron N include "input" or "inverting input." In addition, the connections may include only one of the input types, "input" and "inverting input." Note that the example illustrated in A of FIG. 4, connections are highlighted that extend from the neurons N indicated by solid lines to the neurons N indicated by dashed lines and that, although connections actually extend from all neurons N, some of the connections are omitted to avoid complicated illustration.

B of FIG. 4 illustrates a neural network model using the first layer and the second layer. For example, in the first layer, a connection pattern is present that is similar to that in the configuration illustrated in A of FIG. 4. Here, the connection pattern may include only positive input or a mix with inverting input. In addition, between the first layer and the second layer, weights are set for the respective neurons in such a manner that the connection from the first layer to the second layer is positive, whereas the connection from the second layer to the first layer is inverting. The connections may employ a fully-connected configuration, a configuration with connections probabilistically decimated from the fully-connected configuration, a configuration in which neurons spatially close to the first layer are locally connected (the configuration illustrated in B of FIG. 4), or the like. Note that, in the example illustrated in B of FIG. 4, only bidirectional connections are highlighted that are present between the neurons N in the first layer indicated by solid lines and the neurons N in the second layer indicated by solid lines and that the neurons N in the second layer indicated by solid lines are illustrated to connect only to the neurons N in the first layer indicated by solid lines and located on the periphery thereof. However, note that each neuron N in the second layer may be fully or probabilistically fully connected to all the neurons N in the first layer.

Figure 5:
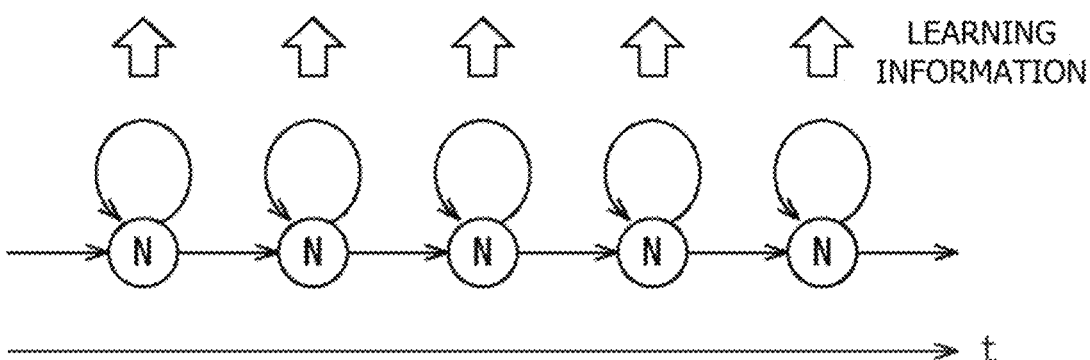
FIG. 5 is a diagram for describing an example in which a plurality of neurons is unrolled in a time direction.

With reference to FIG. 5 and FIG. 6, a mechanism will be described in which the neural network processor 13 transmits information to the image sensor 12.

For example, as illustrated in FIG. 5, the neural network processor 13 can unroll a plurality of the neurons N in the time direction (unrolled model) to acquire and accumulate, at every time step, values of learning information obtained from the individual neurons N.

A of FIG. 6 illustrates a processing example in which learning information is accumulated for each pixel 21.

For example, information is transmitted to the learning unit 38 at the ratio of k neurons N on an output side to one pixel 21 on an input side, and the learning unit 38 forms learning information according to the ratio of the output to the input. Then, the learning unit 38 sequentially feeds the learning information to the learning memory 42 and causes the learning memory 42 to add the learning information to each pixel 21. Subsequently, the group IF 31 transmits the learning information accumulated in the learning memory 42 to each pixel 21 of the image sensor 12 at a predetermined time.

B of FIG. 6 illustrates a processing example in which learning information is accumulated for each pixel group 22.

For example, information is transmitted to the learning unit 38 at the ratio of n×k neurons N on the output side to n pixel 21 on the input side, and the learning unit 38 forms learning information according to the ratio of the output to the input. Then, the learning unit 38 sequentially feeds the learning information to the learning memory 42 and causes the learning memory 42 to add the learning information all together, instead of separately adding the learning information to each pixel 21. The group IF 31 transmits the learning information accumulated in the learning memory 42 to the corresponding pixel group 22 of the image sensor 12 at a predetermined time.

As described above, the neural network processor 13 can accumulate the learning information for each pixel 21 or for each pixel group 22 and transmit, to the image sensor 12 side, information based on the learning information.

<Connection Configuration Example of Group IF>

For example, a first connection configuration example illustrated in A of FIG. 7 corresponds to a connection configuration in which the neural network processor 13 includes one input/output IF 40, and a plurality of the group IFs 31 is connected to the image sensor 12 via the input/output IF 40. Therefore, transmission and reception of data to and from the image sensor 12 are performed via the input/output IF 40, and the input/output IF 40 distributes data transmitted from the image sensor 12 to the corresponding group IFs 31.

A second connection configuration example illustrated in B of FIG. 7 corresponds to a connection configuration in which the pixel groups 22 and the neuron groups 39 correspond to one another via the group IFs 31 on a one-to-one basis.

In addition, a third connection configuration example illustrated in FIG. 8 indicates a connection configuration in which the group IF 31 are connected in a hierarchical structure. In the illustrated example, a plurality of the lower-layer group IFs 31D is connected to the upper-layer group IF 31U, and a plurality of the upper-layer group IFs 31 is connected to the image sensor 12 via the input/output IF 40.

<Configuration Example of Image Sensor 12>

Figure 9:
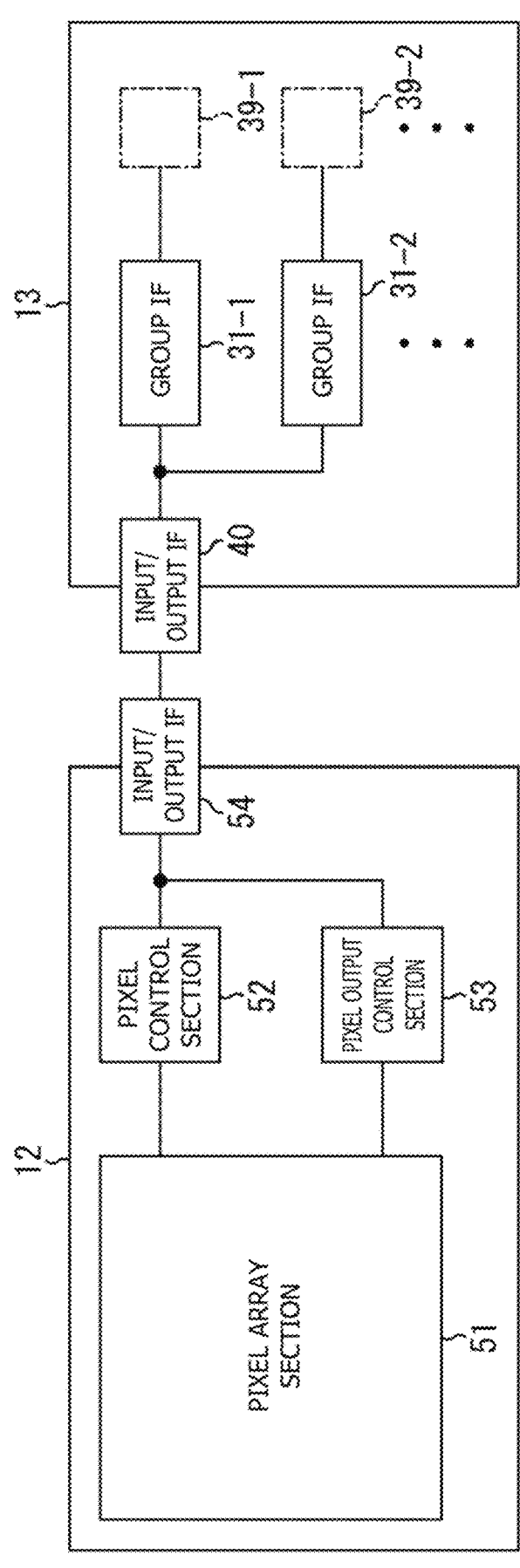
FIG. 9 is a diagram illustrating a configuration example of an image sensor.

For example, as illustrated in FIG. 9, the image sensor 12 includes a pixel array section 51 connected to an input/output IF 54 via a pixel control section 52 and a pixel output control section 53. In this case, in the neural network processor 13, the group IFs 31 are connected in the connection configuration as illustrated in A of FIG. 7.

The pixel control section 52 performs control of properties of the pixels 21 arranged in the pixel array section 51 in an array, control of the region-of-interest appearing in the image captured by the image sensor 12, and the like. For example, the properties of the pixel 21 are determined by a bias value and the like. In addition, the pixel control section 52 performs caching and management of a register determining the pixel properties. For example, the properties of the pixel 21 include sensitivity, response speed, the amount of noise, and the like.

The pixel output control section 53 performs control for rasterizing data in the pixel array section 51 and outputting the rasterized data, and the like. In addition, the pixel output control section 53 may execute preprocessing on output data, or a block (not illustrated) connected to the pixel output control section 53 may execute preprocessing on output data. For example, the preprocessing includes denoising, adjustment of gain or the amount of output, removal of flicker, and the like.

In the solid-state imaging device 11, the contents of control of the image sensor 12 are determined on the basis of the results of processing executed in the neural network processor 13. For example, on the basis of the learning signal described above, the pixel control section 52 can adjust the properties of the pixel 21 (for example, one or more of a gain, a delay, and a noise, and an unresponsive period) and control the region-of-interest (for example, determine or change the region-of-interest and set the pixels other than those in the region-of-interest into the standby state), and the pixel output control section 53 can change parameters such as preprocessing.

Figure 10:
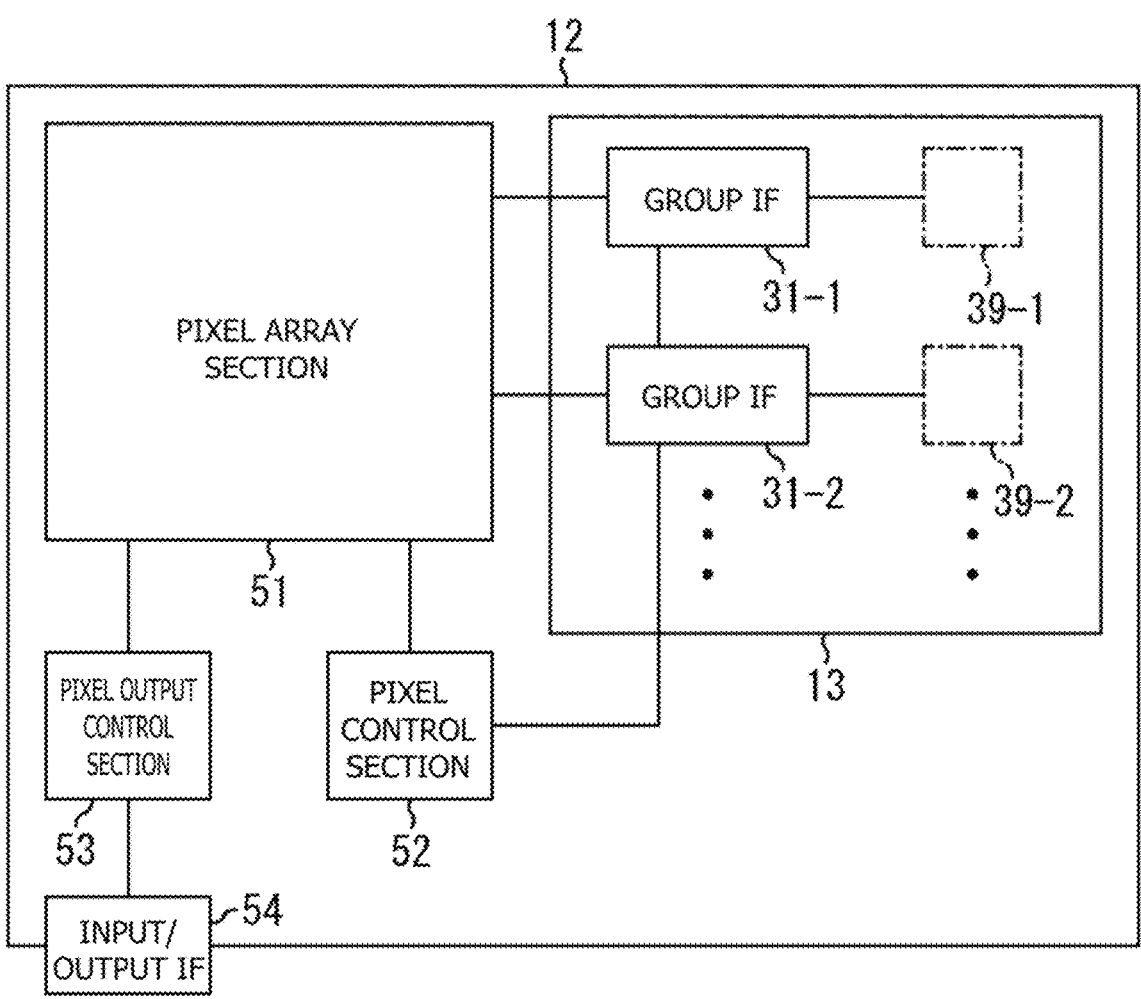
FIG. 10 is a diagram illustrating a configuration example in which a neural network processor is mounted inside the image sensor.

In addition, as illustrated in FIG. 10, the neural network processor 13 may be implemented inside the image sensor 12. In this case, in the neural network processor 13, the group IFs 31 are connected in such a connection configuration illustrated in B of FIG. 7.

<Operation for Learning>

Figure 11:
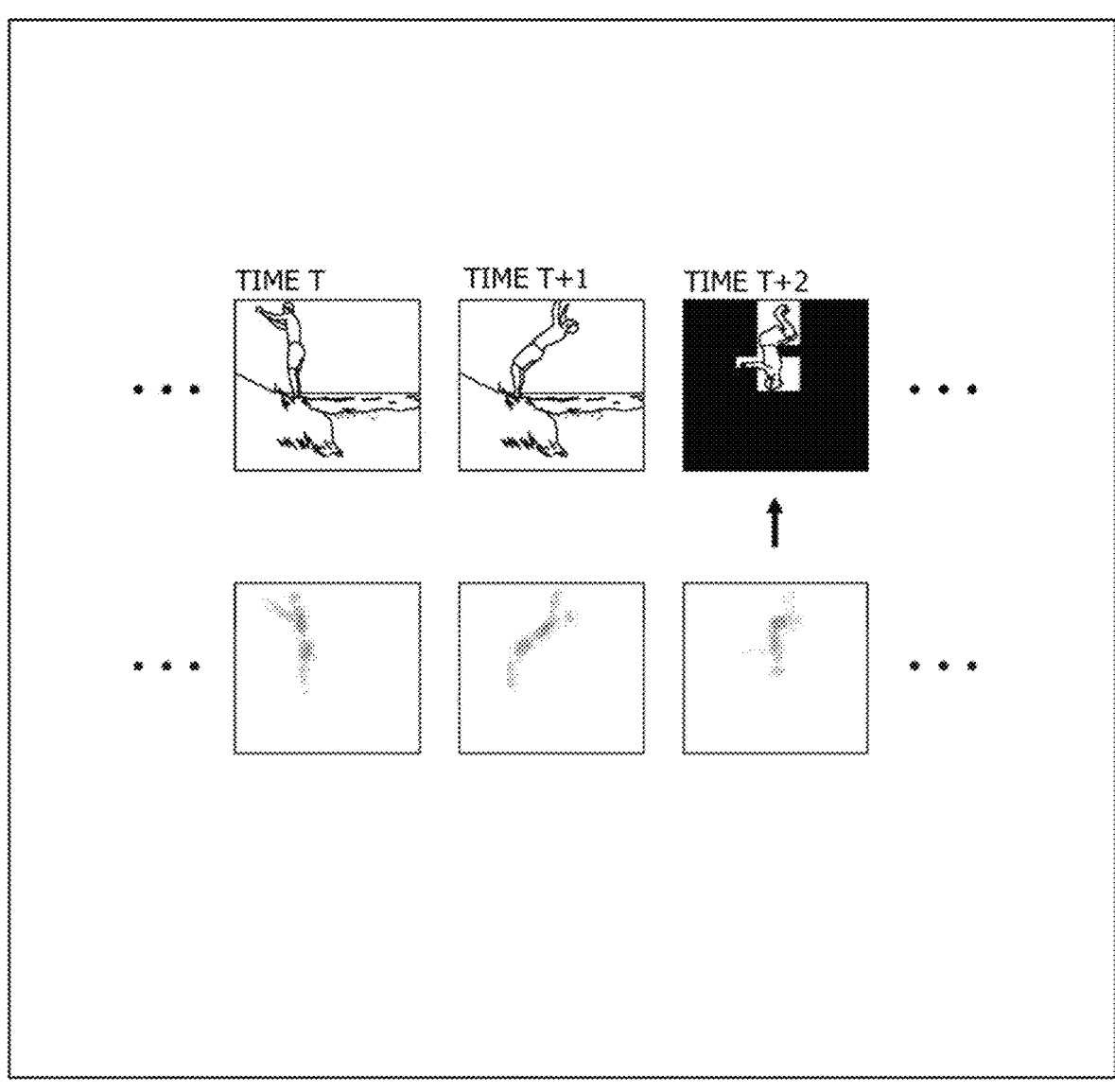
FIG. 11 is a diagram for describing an example in which only a required region is output.
Figure 12:
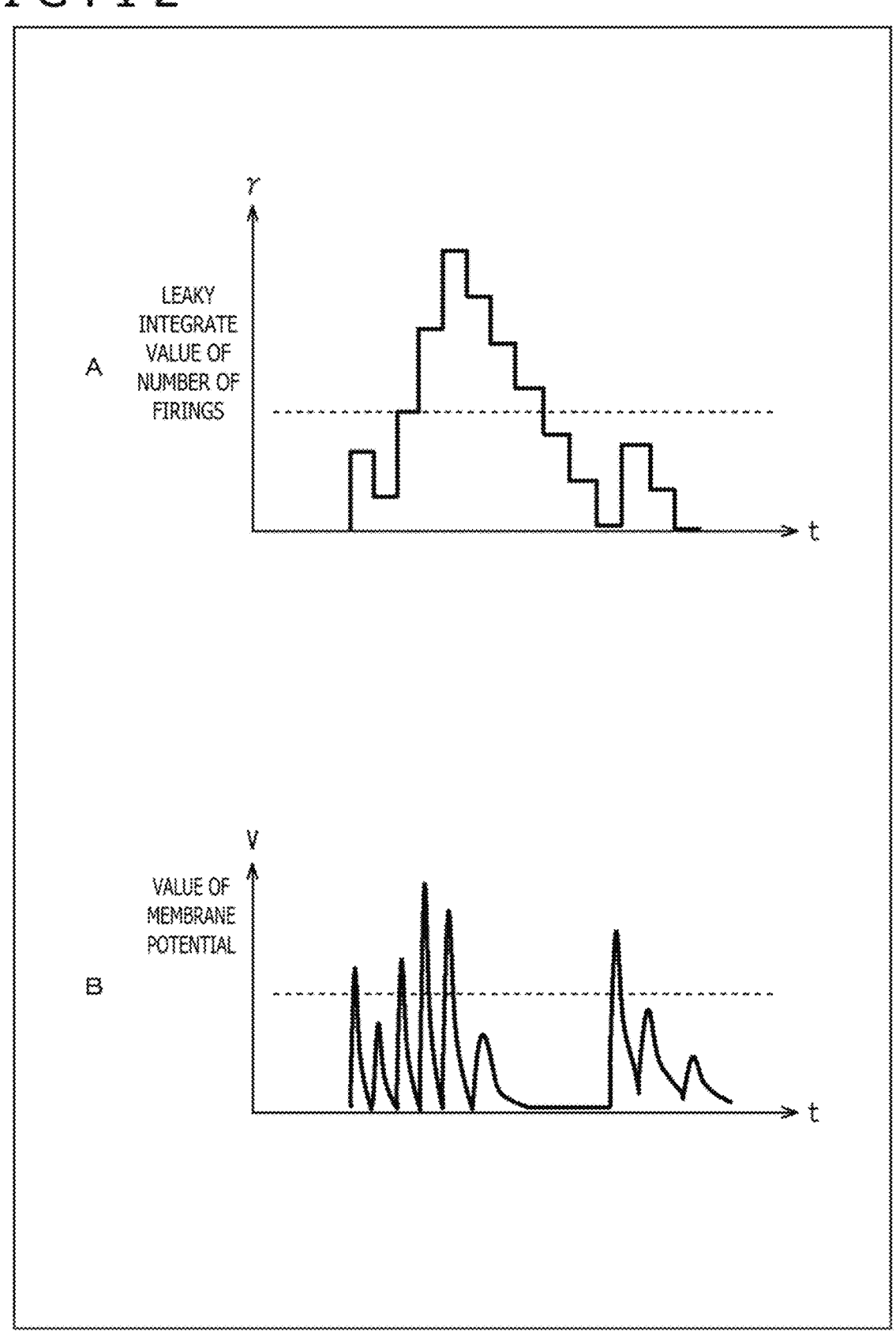
FIG. 12 depicts diagrams illustrating an example of a leaky integrate value for the number of firings and a membrane potential.
Figure 13:
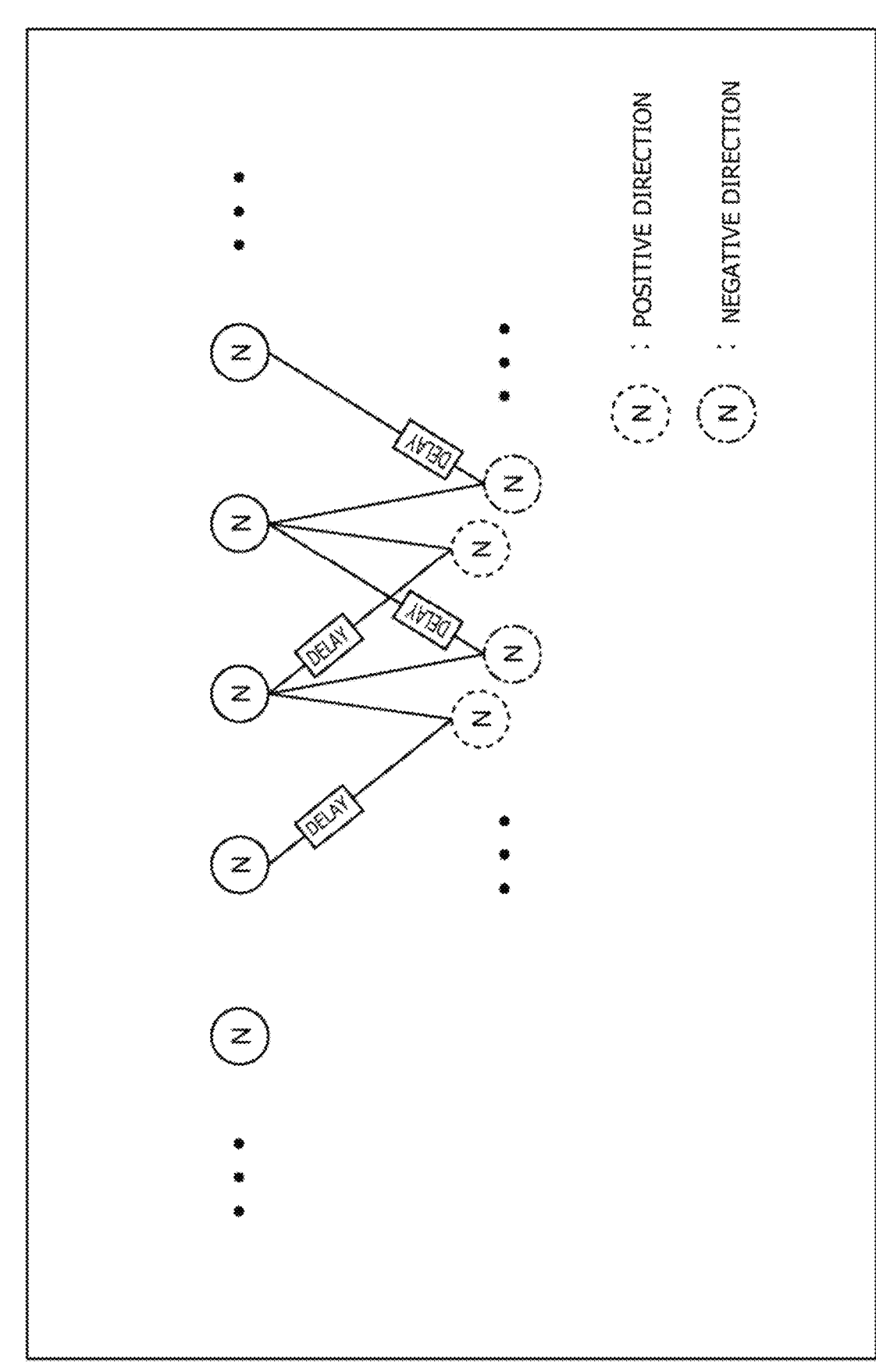
FIG. 13 is a diagram for describing flow estimation of firing rates of neurons.

With reference to FIG. 11 to FIG. 13, operation for leaning performed across the image sensor 12 and the neural network processor 13 in the solid-state imaging device 11 will be described.

By switching the pixels 21 to be output-driven according to the firing frequency of neurons, the solid-state imaging device 11 can exclusively output the required region.

An upper side of FIG. 11 illustrates images at the respective times that are output from the image sensor 12, and a lower side of FIG. 11 illustrates an example of a heat map obtained by mapping the firing rates of active neurons obtained from the images at the respective times. For example, at time T3, an image is output that is obtained by learning the required region at time T3 from the heat maps at time T1 and at time T2, and setting an image of only the required region, that is, an image with the pixels 21 other than those in the required region set into a non-driven state (standby state).

As described above, by outputting only the required region, the solid-state imaging device 11 can increase the efficiency of power and the like.

Here, in the solid-state imaging device 11, when the pixel 21 is switched between the non-driven state and the driven state, state transition of the pixel 21 may require much time.

Accordingly, the solid-state imaging device 11 controls driving such that the pixels 21 in a transition wait state suspend state update and hold the state of the pixels 21 and that the pixels 21 other than those in the transition wait state continue processing. Then, the solid-state imaging device 11 can predict the pixels requiring state transition at the next time on the basis of changes in the firing rates of the neurons, that is, the differential of frequency (or information corresponding to the differential of frequency) and preliminarily prepare the pixels 21 for which driving is started at the next time.

With reference to FIG. 12, formation of a learning signal will be described as a first example of an operation corresponding to the differential of frequency.

First, as a first scheme, when the leaky integrate value y for the number of firings illustrated at A in FIG. 12 exceeds a predetermined value, the LI unit 35 issues a signal (+1). When the leaky integrate value y is below the predetermined value, the LI unit 35 issues a signal (−1). In addition, as a second scheme, when a value v of a membrane potential illustrated in B of FIG. 12 and the leaky integrate value y of the number of firings illustrated in A of FIG. 12 are within predetermined value ranges, the firing unit 36 issues a signal (±1).

The solid-state imaging device 11 employs a learning scheme such as the first scheme or the second scheme, causes the group IF 31 to increment the corresponding signal for a predetermined time, uses the resultant signal as a learning signal, and starts control of the pixels 21 when the value of the learning signal exceeds a predetermined threshold. Employing such processing allows prediction of pixels requiring state transition at the next time and preliminary preparation of the pixels 21 for which driving is started at the next time.

With reference to FIG. 13, flow estimation of the firing rates of neurons will be described as a second example of an operation corresponding to the differential of frequency.

For example, a direction from the left to the right of the neurons N illustrated in FIG. 13 is assumed to be a positive direction. Then, in a case where a timing when a signal from a certain neuron N reaches a positive-direction neuron N overlaps a timing when a signal from a neuron N to the left of the relevant neuron N reaches the positive-direction neuron N with a predetermined delay, the firing rate of the positive-direction neuron N rises. In other words, the positive direction can be replaced with the firing rate.

Then, by replacing the learning signal described with reference to FIG. 12 with the firing rate and using the firing rate for control of the pixels 21, for example, the solid-state imaging device 11 can predict movement of the neuron heat map and pre-drive the pixels 21 in a high firing region at the next time.

In the solid-state imaging device 11 configured as described above, for example, when the region-of-interest is output from the image sensor 12 and input to the neural network processor 13, an operation is performed for recognizing a subject appearing in the region-of-interest, and according to the result of the operation, the region-of-interest at the next time can be notified to the image sensor 12. Thus, the solid-state imaging device 11 can change the region-of-interest that the image sensor 12 outputs at the next time.

<Illustration of Network Configuration>

With reference to FIGS. 14 to 19, a network configuration employed for the solid-state imaging device 11 will be described. Note that the network configuration described here is illustrative and the solid-state imaging device 11 may employ another network configuration without being limited to this illustration.

Figure 14:
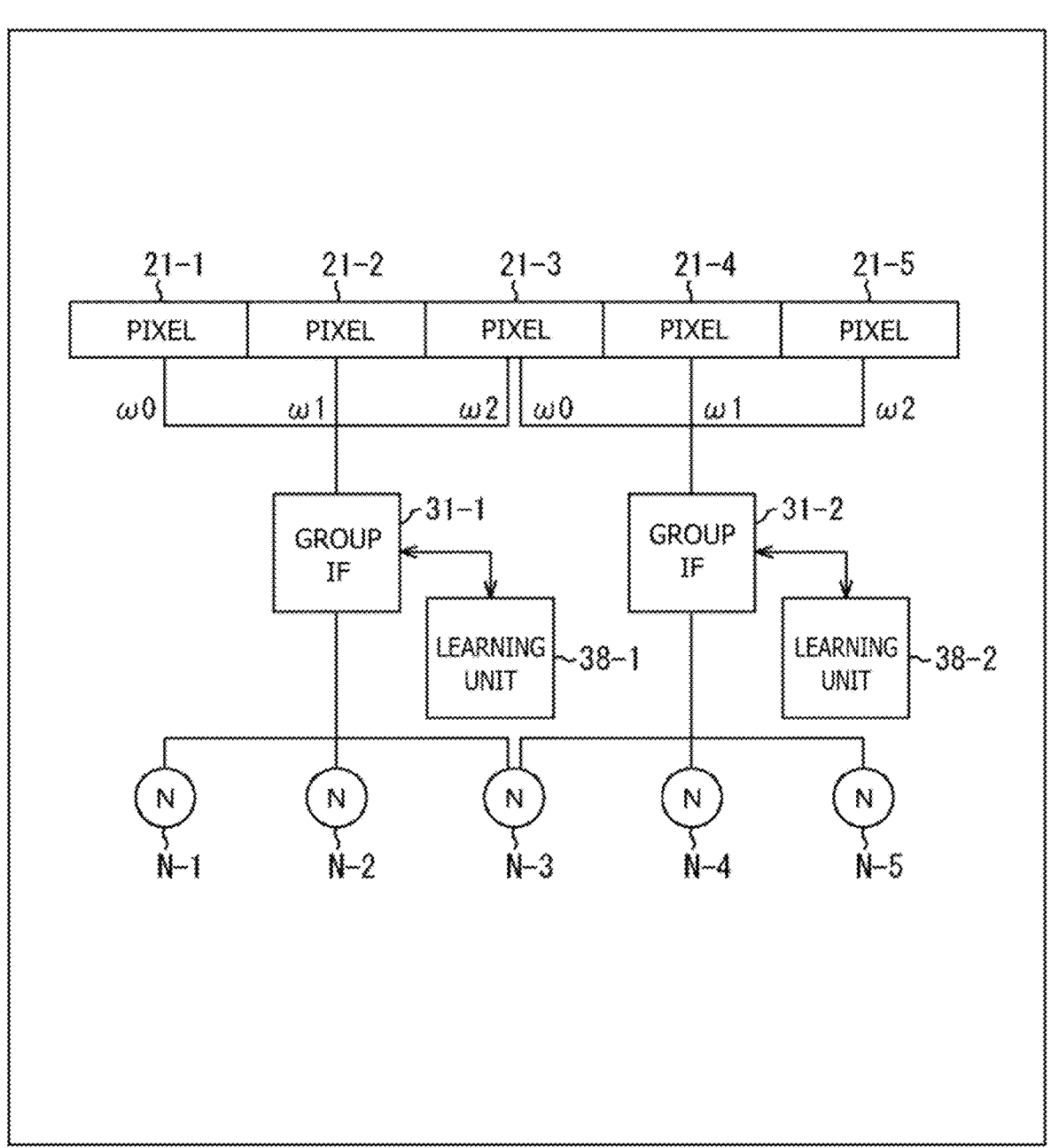
FIG. 14 is a diagram illustrating a first configuration example of a network configuration.

In a first configuration example of a network configuration illustrated in FIG. 14, the solid-state imaging device 11 is configured in such a manner that the pixel 21 included in the pixel group 22 is duplicated and the neuron N included in the neuron group 39 is duplicated. In other words, the pixel 21-3 of the pixels 21-1 to 21-5 is connected to each of the group IFs 31-1 and 31-2, and the neuron N-3 of the neurons N-1 to N-5 is connected to each of the group IFs 31-1 and 31-2. Therefore, the pixel 21-3 is included in the two pixel group 22 and duplicated in each group, and the neuron N-3 is included in the two neuron group 39 and duplicated in each group.

In addition, weights ω0 to ω3 illustrated in FIG. 14 indicate weights in a weighted convolution, and FIG. 14 is an example of a convolution.

Note that the solid-state imaging device 11 may have a network configuration (not illustrated) in which the pixels 21 are connected to the group IFs 31 in such a manner as to avoid duplicating the arrangement of the pixels 21. In addition, the solid-state imaging device 11 may have a network configuration (not illustrated) in which the pixels 21 are arranged to be fully connected to the group IFs 31.

In a second configuration example of a network configuration illustrated in FIG. 15, the solid-state imaging device 11 includes one or more neural network circuits 61 between the arrangement of the pixels 21 and the group IFs 31. In other words, pixel signals output from the pixels 21-1 to 21-5 are input to the neural network circuit 61, and predicted pixels 62-1 to 62-5 of a predicted image output from the neural network circuit 61 are connected to each of the group IFs 31-1 and 31-2.

Figure 16:
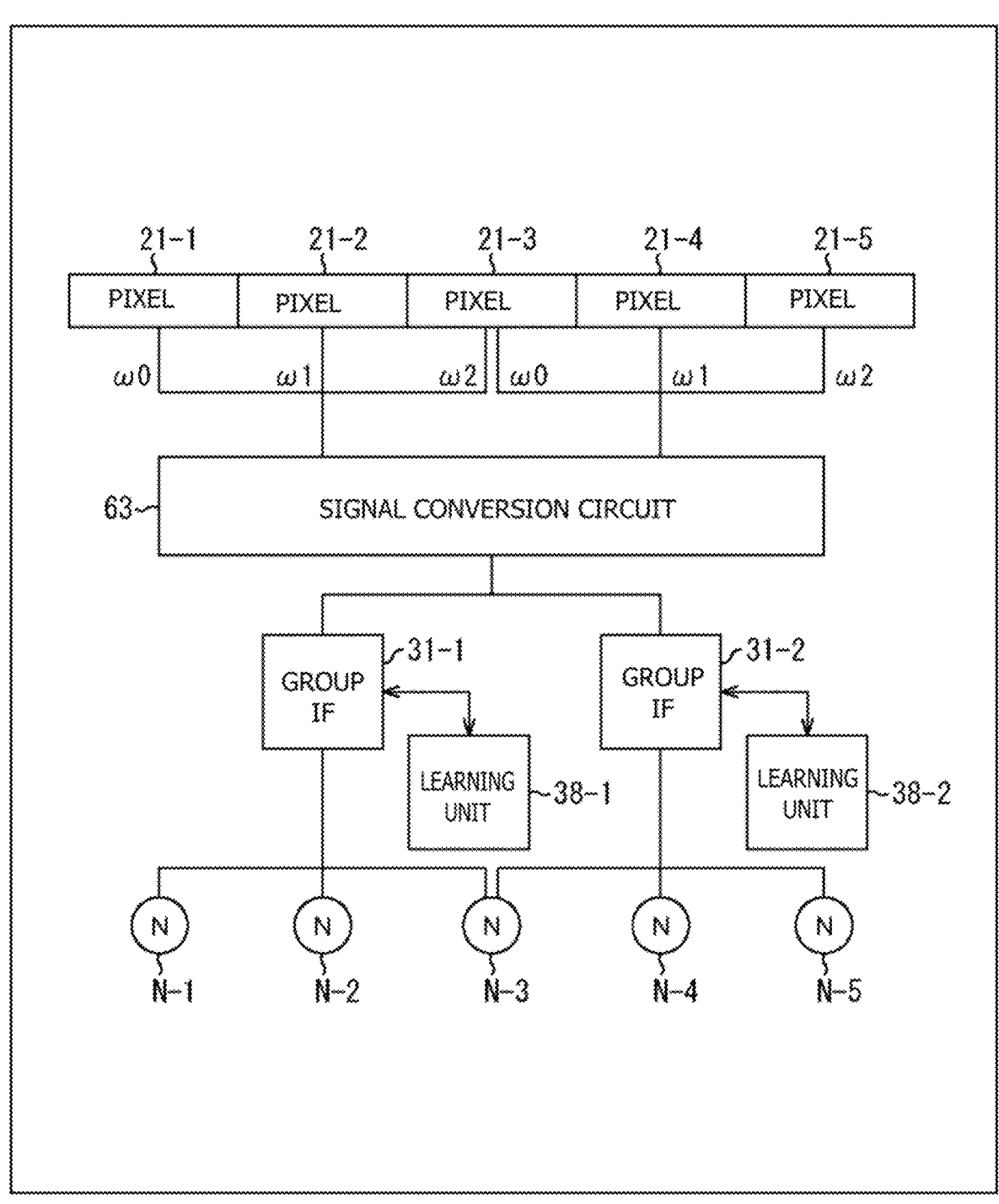
FIG. 16 is a diagram illustrating a third configuration example of a network configuration.

In a third configuration example of a network configuration illustrated in FIG. 16, the solid-state imaging device 11 is configured in such a manner that a pixel conversion circuit 63 is arranged between the arrangement of the pixels 21 and the group IFs 31. As the pixel conversion circuit 63, an AD (Analog-Digital) converter or the like is used, and the pixel conversion circuit 63 converts, into digital values or binary values, the values of analog signals (potentials or currents) output from the pixels 21, and inputs the digital values or the binary values to the group IFs 31-1 and 31-2.

In a fourth configuration example of a network configuration illustrated in FIG. 17, the solid-state imaging device 11 is configured in such a manner that a convolution layer 64 is arranged between the arrangement of the pixels 21 and a plurality of group IFs 65 (an interface including a plurality of groups IF 31). Note that the convolution layer 64 may be a network corresponding to a combination of operations each including a plurality of convolution operations. Furthermore, a group neuron 66 connected to the plurality of group Ifs 65 may include one type of convolution operation such as Attractor, Convolution, Fully Connection, or Self-Attraction, or may include a combination of a plurality of convolution operations. Needless to say, the group neuron 66 may include types of operations other than the illustrated operations. Note that the structure illustrated in FIG. 4 described above corresponds to more accurate illustration of the structure of the neural network model (Attractor) illustrated as the group neuron 66.

Figure 18:
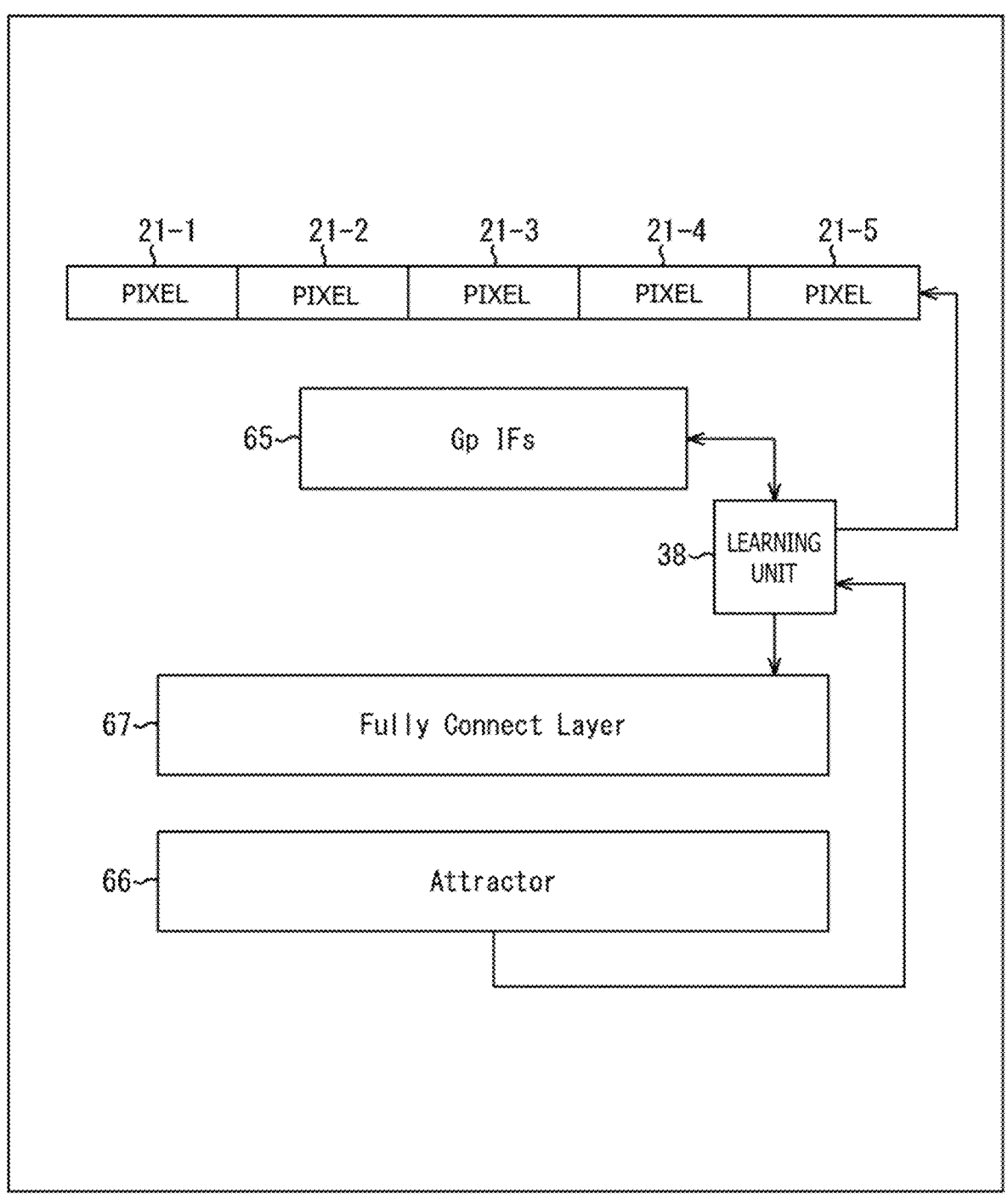
FIG. 18 is a diagram illustrating a fifth configuration example of a network configuration.

In a fifth configuration example of a network configuration illustrated in FIG. 18, the solid-state imaging device 11 is configured in such a manner that the learning unit 38 is used as a purpose of executing both an operation for update (online learning) of weights in a fully contact layer 67 that is a weighted operation layer in the neural network processor 13 and an operation for control of the pixels 21.

Figure 19:
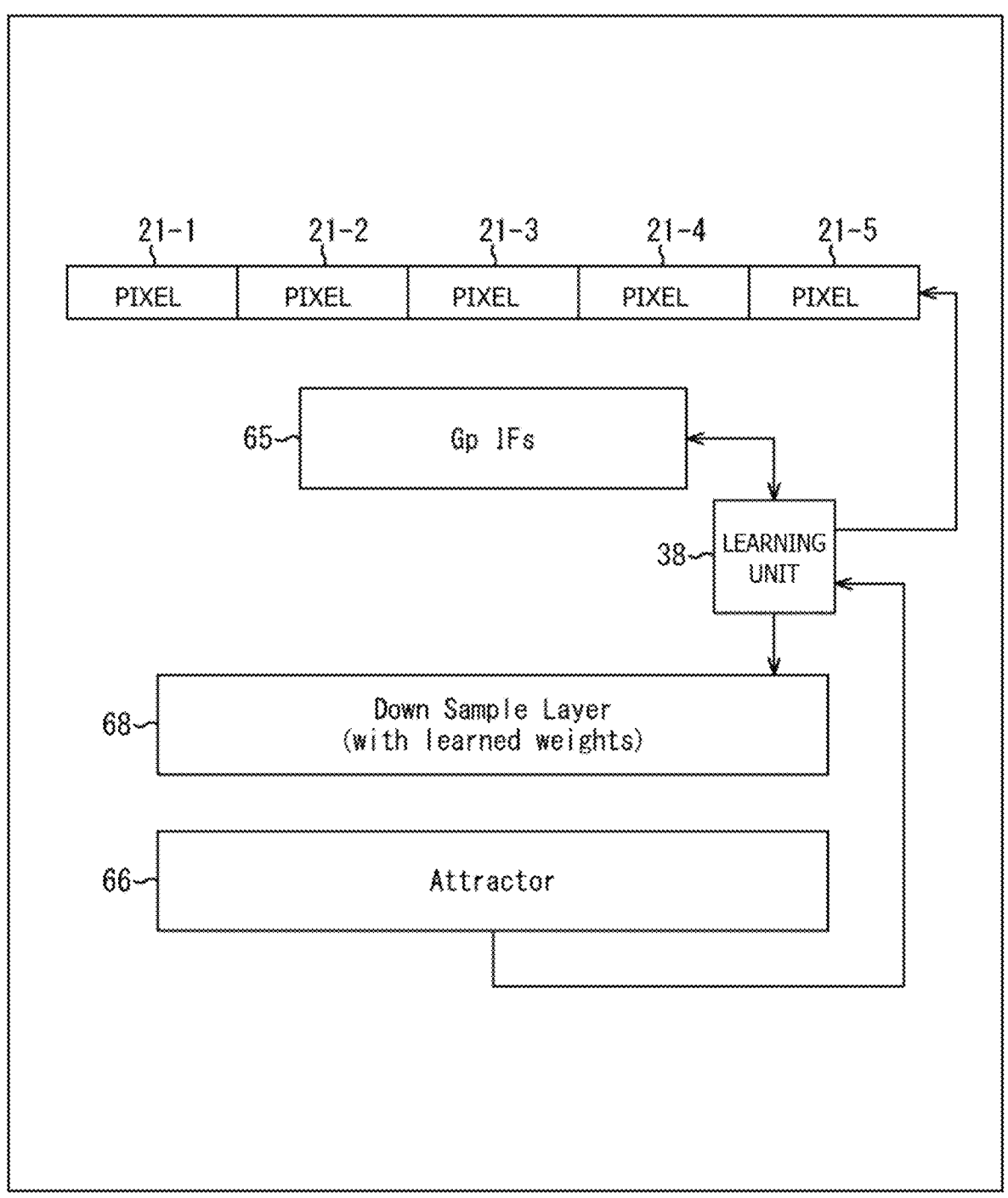
FIG. 19 is a diagram illustrating a sixth configuration example of a network configuration.

In a sixth configuration example of a network configuration illustrated in FIG. 19, the solid-state imaging device 11 is configured in such a manner that the learning unit 38 is used as a purpose of executing both an operation for update (online learning) of weights in a down sample layer 68 that is a weighted operation layer in the neural network processor 13 and an operation for control of the pixels 21.

<Group Addressing>

With reference to FIGS. 20 to 23, group addressing will be described.

For example, to simplify learning and pixel control and to reduce the scale of the control circuit, the solid-state imaging device 11 is efficiently subjected to grouping to associate the plurality of pixels 21 with the plurality of neurons N. With such grouping, both the image sensor 12 and the neural network processor 13 communicate with each other through resultant groups, that is, via group addresses. In the solid-state imaging device 11, this improves the controllability of the region-of-interest and also enables, with a small number of bits, communication of a change in the address on the neural network processor 13 corresponding to a change in the address of the region-of-interest on the image sensor 12 side.

For example, an example will be described in which a region-of-interest with a small size is changed to a region-of-interest with a large size as illustrated in A of FIG. 20. In this case, the address is changed from the pixel group 22 to the neuron group 39 as illustrated in B of FIG. 20.

For example, in a case where a method is used in which the address is changed in the interface portion, an address conversion operation needs to be performed for each output from the pixels 21 and for each input to the pixels 21, reducing the efficiency of processing. That is, in this case, the pixel groups 22 fail to be utilized to change the address, thereby leading to the need for time and effort to re-interpret pixel coordinates across the pixel groups 22. For example, as illustrated in C of FIG. 20, regardless of whether the neuron group 39 indicated by a large grid is larger (left) or smaller (right) than the pixel group 22 indicated by a small grid, the input of different pixel groups 22 may enter the same neuron group 39. Accordingly, an increased amount of access is made to the neuron group 39, thereby leading to a wait for processing. In particular, in a case where a pixel output format is "Rastered," a wait for processing may occur significantly frequently.

To address this problem, the solid-state imaging device 11 employs a method of changing the address on the neuron N side, and between the image sensor 12 and the neural network processor 13, maintaining the pixel groups 22 and the neuron groups 39 on a one-to-one correspondence.

Figure 20:
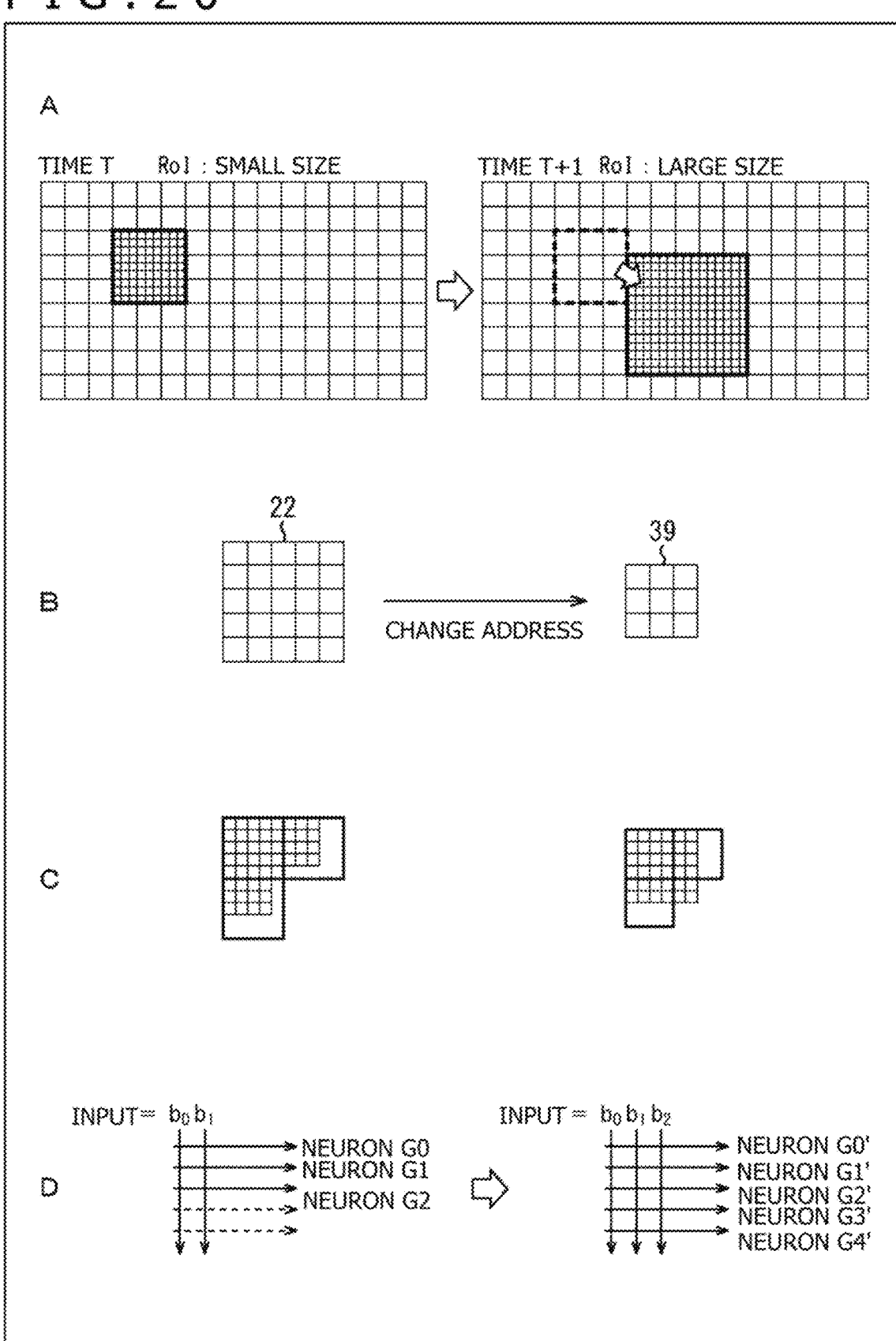
FIG. 20 depicts diagrams for describing address change.

That is, as illustrated in D of FIG. 20, by operating the addresses of the neurons N to associate the pixel groups 22 with the pixel groups 22, the operation of the addresses may need to be performed only once each time the region-of-interest is changed, allowing the processing to be efficiently executed.

In D of FIG. 20, address lines indicated by dashed lines are not used for the region-of-interest with a small size, and address lines G0 to G2 are used for the region-of-interest with a small size. The addresses are operated according to a change in the region-of-interest to one with a large size, and address lines G0' to G4' are used. Note that D of FIG. 20 assumes an addressing/access circuit based on a Content Addressable Memory (CAM) but that even soft memory similarly enables the addresses to be changed.

Figure 21:
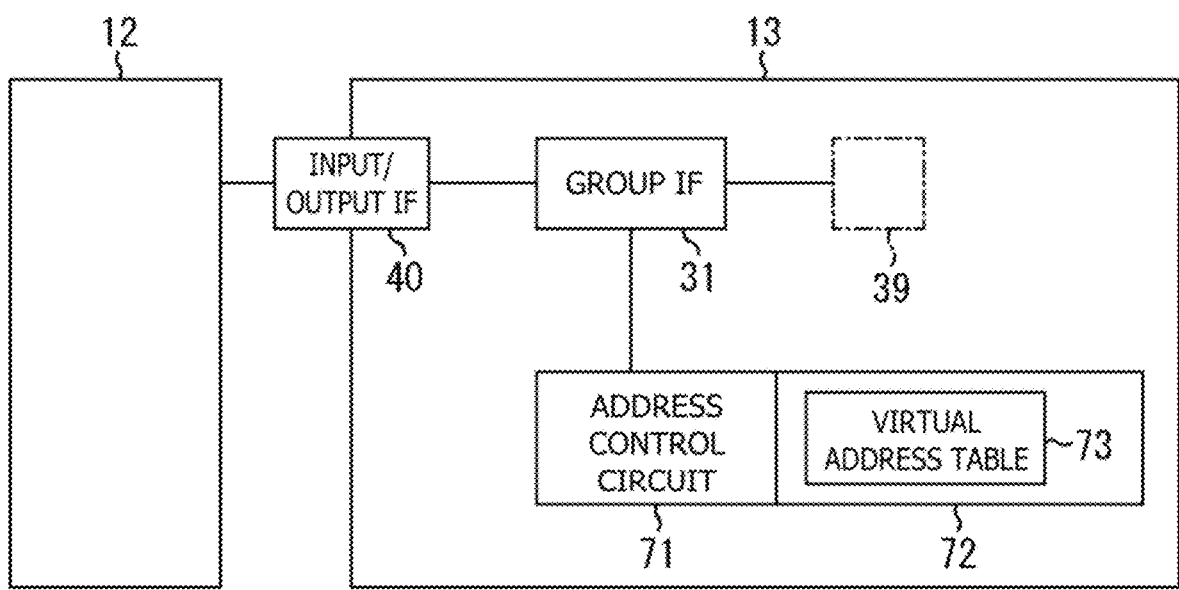
FIG. 21 is a block diagram illustrating a configuration example of a neural network processor including an address control circuit.

FIG. 21 is a block diagram illustrating a configuration example of the neural network processor 13 including an address control circuit 71.

As illustrated in FIG. 21, the neural network processor 13 includes the address control circuit 71 connected to the group IF 31, and the address control circuit 71 is provided with a storage section 72. The storage section 72 stores a virtual address table 73 that is rewritten according to a notification from the image sensor 12.

The address control circuit 71 references the virtual address table 73 stored in the storage section 72 to execute address conversion processing of changing the address on the neuron N side.

FIG. 22 is a diagram for describing the address conversion processing executed by the address control circuit 71.

For example, when the pixel group 22 is changed in response to a change in the region-of-interest, the image sensor 12 feeds an RoI change notification and an address pattern, a group address, and data to the neural network processor 13. According to the RoI change notification, the address control circuit 71 determines the address to be changed, performs an address rewriting operation on the basis of a pattern table and an address table for the group addresses, and outputs the changed address. Then, Integration of the group address fed from the image sensor 12 with the changed address output from the address control circuit 71 results in identifying the physical address of each neuron N in the neuron group 39. In other words, by changing the virtual address of the neuron group 39 corresponding to the changed pixel group 22, the pixel group 22 is newly associated with the neuron group 39.

FIG. 23 is a diagram for describing an example of the RoI change notification.

For example, as illustrated in A of FIG. 23, inputting a rasterized group causes decimation to be performed after the data is rearranged in such a manner as to align with the arrangement of the neurons. Here, at the time of the rearrangement, to accept a case where the data is not square, the image sensor 12 inputs information for zero padding to the neural network processor 13.

Then, for a single region-of-interest, such data as illustrated in B of FIG. 23 is added to a header. In contrast, for a plurality of regions-of-interest, such data as illustrated in C of FIG. 23 is added to the header.

<Example of Control of Region-of-Interest>

Figure 24:
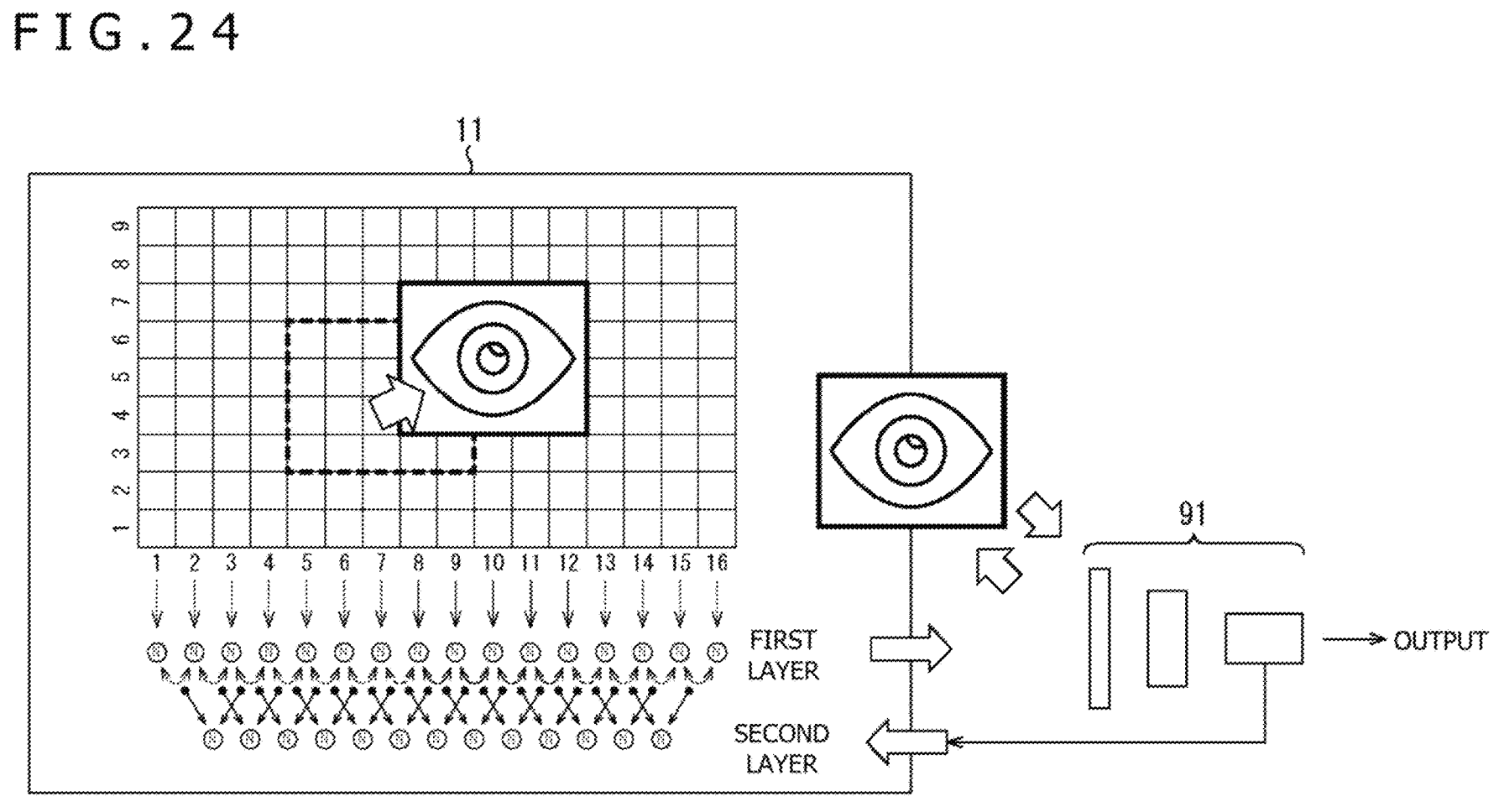

FIG. 24 is a diagram illustrating a network for postprocessing. Note that the structure illustrated in FIG. 4 described above corresponds to more accurate illustration of the structure of the neural network model (Attractor) illustrated in FIG. 24.

For example, a network for tracking the region-of-interest (the neurons N in the first layer and the neurons N in the second layer) has a stacked structure inside the solid-state imaging device 11 in such a manner as to be directly coupled to the pixels 21. Pieces of wiring are stacked by Cu—Cu bonding at an interface between a semiconductor substrate provided with the image sensor 12 and a semiconductor substrate provided with the neural network processor 13, and the group IF 31 is arranged on the neural network processor 13 side of the interface.

A neural network circuit 91 for postprocessing is provided outside the solid-state imaging device 11 to allow both the neural network processor 13 and the neural network circuit 91 for postprocessing to communicate with each other, while allowing both the image sensor 12 and the neural network circuit 91 for postprocessing to communicate with each other. Note that the outside of the solid-state imaging device 11 indicates the destination of communication of serialized output from the pixel 21 through predetermined wiring such as a bus. Therefore, the neural network circuit 91 for postprocessing may be provided inside or outside the solid-state imaging device 11 as long as the neural network circuit 91 is provided at the destination of communication.

For example, an example of estimation of a line-of-sight direction of the "human eye," which is a subject, will be described. Note that an output value from the neural network circuit 91 for postprocessing may be a vector value indicating the line-of-sight direction, or the like.

First, the address control circuit 71 illustrated in FIG. 21 described above is connected to the group IF 31 at an input stage. Then, by performing mutual communication between the address control circuit 71 and the neural network circuit 91 for tracking the region-of-interest illustrated in FIG. 24, for example, the reliability of the region-of-interest is communicated to allow tracking accuracy to be improved. For example, as a signal format indicated by the reliability, a signal that has an intensity like a point spread function centered at the center of gravity of the region-of-interest may be defined and notified.

As described above, it is preferable to differently use, depending on the intended network, a configuration in which the neural network processor 13 is provided inside the solid-state imaging device 11 and the neural network circuit 91 for postprocessing is provided outside the solid-state imaging device 11, that is, the neural network processor 13 and the neural network circuit 61 are separately arranged.

For example, for a first network intended to extract required information from the entire angle of view, a configuration is preferably employed in which all the pixel groups 22 and all the neuron groups 39 are associated with one another as illustrated in B of FIG. 7 described above. This provides the apparatus with readiness and enables a reduction in power. In other words, such a configuration relatively reduces the amount of data handled by the individual group IFs 31, enabling mitigation of congestion (latency) involved in data transmission and reception, and the like. Furthermore, employment of such a stacked structure enables a reduction in signal transmission distance between the pixels 21 and the neurons N, thus allowing an increased processing speed and reduced power consumption to be expected.

For example, for a second network intended to extract required information from a part of the angle of view, preferably, the neural network circuit 91 for postprocessing is provided, and predetermined output is provided outside the solid-state imaging device 11, allowing advanced processing to be flexibly executed. In other words, in a configuration in which the neural network processor 13 extends below the entire bottom surface of the image sensor 12, with the pixels 21 connected to the group IFs 31, as illustrated in B of FIG. 7 described above, some of the pixels 21 are unused, leading to a large amount of wasted wiring and the like. In addition, regardless of whether the neural network circuit 91 is arranged inside or outside the solid-state imaging device 11, the neural network circuit 91 of a required scale only needs to be arranged as long as the neural network circuit 91 is provided outside the pixels 21. Accordingly, this configuration is efficient in terms of footprint and the like. Alternatively, the present embodiment need not be limited to the neural network processor 13 including such input/output IF 40 as illustrated in A of FIG. 7. For example, roles may be divided between the neural network circuit 91 with a general-purpose GPU (Graphics Processing Unit) and the like and the neural network processor 13 configured in such a manner that all the pixel groups 22 are associated with all the neuron groups 39 as illustrated in B of FIG. 7 described above; the neural network circuit 91 may execute advanced processing, whereas the neural network processor 13 may be responsible for light, high-speed processing.

The combined use of the first network and the second network allows optimized sharing of processing of the whole system (for example, adjustment of the processing speed and power, and the like) to be expected. In addition, by performing operations while executing communication and control between the pixels 21 and the first and second networks and communication and control between the first network and the second network described above, sharing of processing and accuracy can be expected to be further optimized.

Note that, in the present embodiment, the solid-state imaging device capturing images (RGB images or luminance images) has been described but that the present technology is not limited to the solid-state imaging device and can be applied to various photodetection apparatuses. For example, the present technology can be applied to various photodetection apparatuses such as a sensor utilizing a Photon-Count SPAD (Single Photon Avalanche Diode), an EVS (Event-based Vision Sensor) detecting occurrence of an event, a TOF (Time Of Flight) sensor measuring a distance, and a multispectral sensor acquiring multispectral images with multiple wavelengths. Needless to say, the present technology may also be applied to photodetection apparatuses other than those described above.

<Configuration Example of Electronic Equipment>

The solid-state imaging device 11 described above can be applied to various types of electronic equipment, for example, an imaging system such as a digital still camera or a digital video camera, a mobile phone including an imaging function, or any other equipment including the imaging function.

Figure 25:
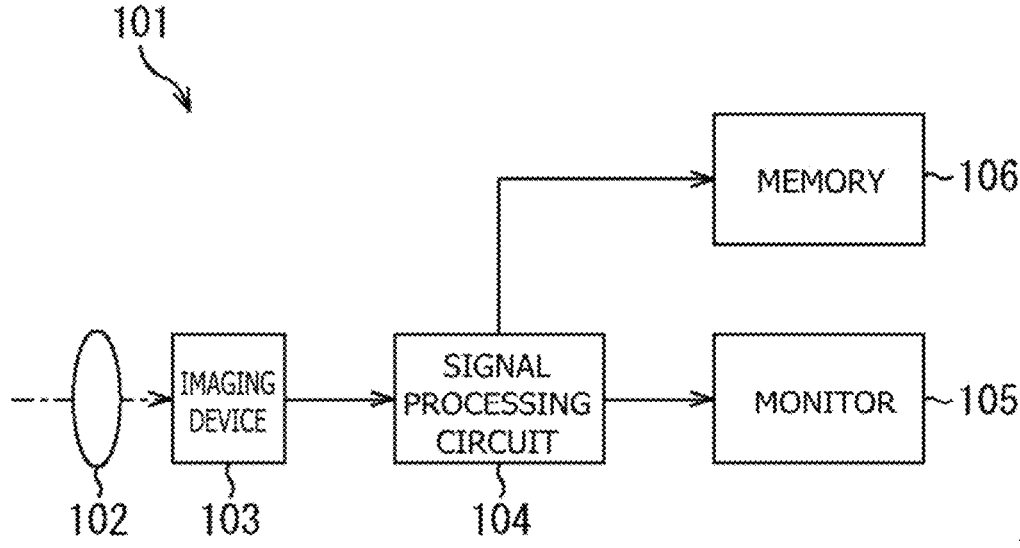
FIG. 25 is a block diagram illustrating a configuration example of an imaging apparatus.

FIG. 25 is a block diagram illustrating a configuration example of an imaging apparatus mounted in electronic equipment.

As illustrated in FIG. 25, an imaging apparatus 101 includes an optical system 102, an imaging device 103, a signal processing circuit 104, a monitor 105, and a memory 106, and can capture still images and videos.

The optical system 102 includes one or more lenses and guides image light (incident light) from a subject to the imaging device 103 to form an image on a light receiving surface (sensor section) of the imaging device 103.

The solid-state imaging device 11 described above is applied as the imaging device 103. Electrons are accumulated in the imaging device 103 for a fixed period according to an image formed on the light receiving surface via the optical system 102. Then, a signal according to the electrons accumulated in the imaging device 103 is fed to the signal processing circuit 104.

The signal processing circuit 104 executes various types of signal processing on pixel signals output from the imaging device 103. An image (image data) resulting from the signal processing by the signal processing circuit 104 may be fed to the monitor 105 for display or to the memory 106 for storage (recording).

By applying the solid-state imaging device 11 described above to the imaging apparatus 101 configured as described above, for example, processing can be efficiently executed on the captured image.

<Use Example of Image Sensor>

Figure 26:
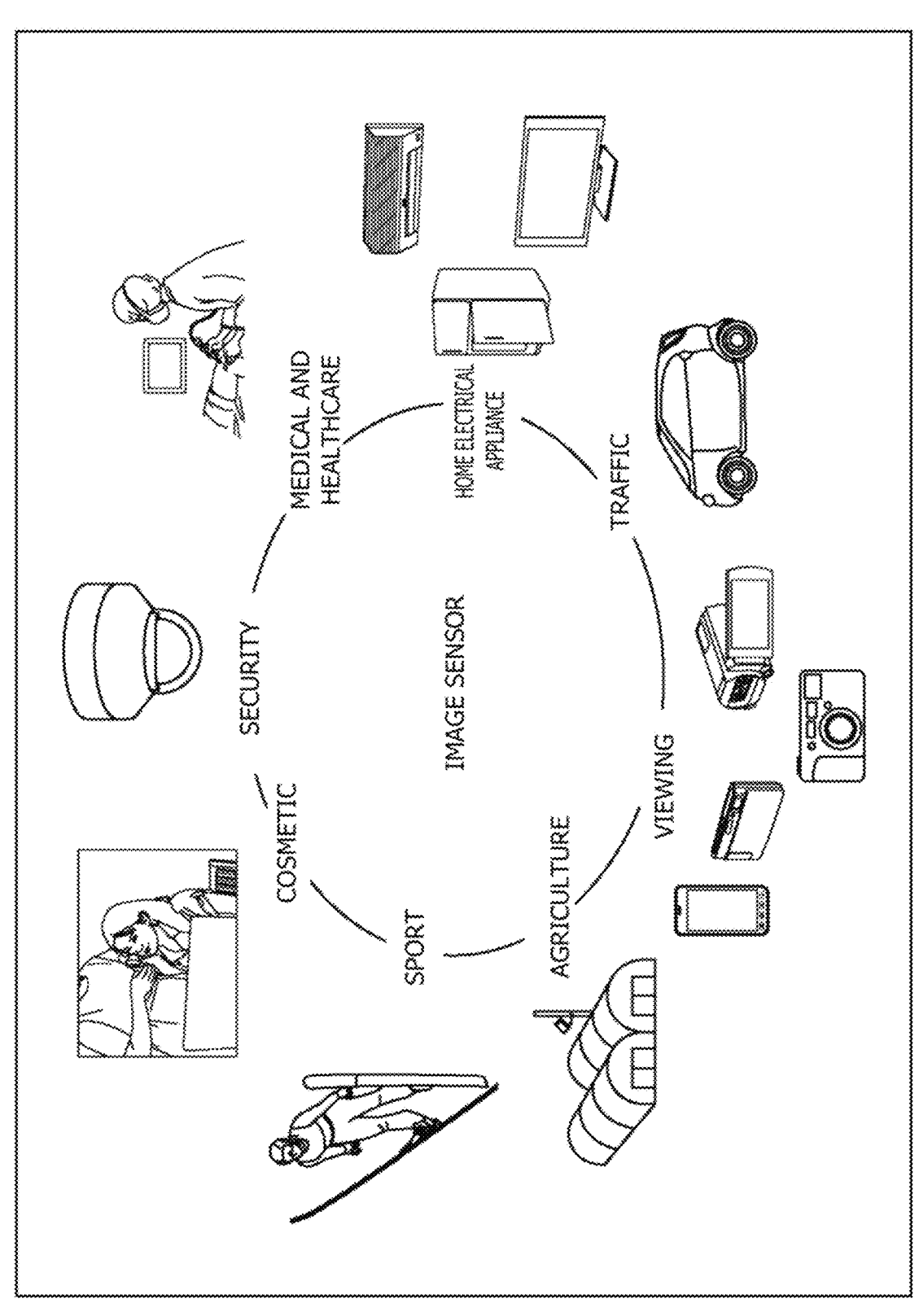
FIG. 26 is a diagram illustrating a use example in which the image sensor is used.

FIG. 26 is a diagram illustrating a use example of use of the image sensor (imaging device) described above. The image sensor described above can be used in various cases in which visible light, infrared light, ultraviolet light, an X ray, or the like is sensed, for example, as described below.

An apparatus such as a digital camera or portable equipment with a camera function which captures images for viewing An apparatus used for a traffic application such as an in-vehicle sensor capturing images of the front, rear, surroundings, interior, and the like of an automobile, a monitoring camera monitoring traveling vehicles and roads, or a ranging sensor measuring the distance between vehicles and the like, for safe driving such as automatic stop, recognition of condition of the driver, and the like An apparatus used for a home electrical appliance such as a TV, a refrigerator, or an air conditioner to capture an image of gesture of the user to operate the equipment according to the gesture An apparatus used for a medical or healthcare application, such as an endoscope or an apparatus capturing an image of a blood vessel by receiving infrared light An apparatus used for a security application, such as a security camera for a crime prevention application or a camera for a personal authentication application An apparatus used for a cosmetic application, such as a skin checker capturing an image of the skin or a microscope capturing an image of the scalp An apparatus used for a sport application, such as an action camera or a wearable camera for a sport application An apparatus used for an agricultural application, such as a camera for monitoring the conditions of fields and crops (1)

A photodetection apparatus including:

an image sensor provided with a pixel group including N (N is a positive integer) pixels from among a plurality of pixels arranged on a sensor surface in an array;

a processor in which a neural network is formed by a neuron group with M (M is a positive integer) neurons; and a group interface provided between the pixel group and the neuron group and performing bidirectional communication between the image sensor and the processor.

(2)

The photodetection apparatus according to (1) above, further including:

a pixel control section using a processing result of processing executed in the neural network to control properties of the pixel.

(3)

The photodetection apparatus according to (2) above, in which the pixel control section adjusts any one or more of a gain, a delay, and a noise in a pixel signal output from the pixel and an unresponsive period of the pixel signal.

(4)

The photodetection apparatus according to (2) or (3) above, in which the neural network executes processing of detecting a pixel signal with a fixed, temporally periodic pattern acquired by the image sensor.

(5)

The photodetection apparatus according to any one of (2) to (4) above, in which the pixel control section determines or changes a region-of-interest in which a subject of interest appears in an image captured by the image sensor, and the pixel control section sets the pixels other than those in the region-of-interest into a standby state.

(6)

The photodetection apparatus according to any one of (2) to (5) above, further including:

a firing detection section that, for each of the neurons in the neuron group, in a case where intermediate data determined by each of the neurons exceeds a predetermined threshold, detects firing of the neuron for which the intermediate data exceeds the threshold;

a learning section that determines a learning signal based on a firing rate of the neuron detected by the firing detection unit; and a learning memory that accumulates the learning signal output from the learning section over time, in which a value obtained by accumulating the learning signal in the learning memory is fed to the pixel control section as a control signal and used to control the properties of the pixel.

(7)

The photodetection apparatus according to (6) above, further including:

an operation section that performs a differential of the firing rate of the neuron or an operation corresponding to the differential and feeds a result of the operation to the firing detection section.

(8)

The photodetection apparatus according to (7) above, in which the operation section performs the operation corresponding to the differential by use of at least any one of a leaky integrate value of the number of firings of the neuron and a membrane potential of the neuron.

(9)

The photodetection apparatus according to (7) above, in which the operation section uses the operation corresponding to the differential to determine a time moving rate of the firing rate that is a differential, in a spatial direction, of a spatial distribution of firing rates of the neurons.

(10)

The photodetection apparatus according to (6) above, in which the group interface accumulates the learning signal in the learning memory and performs, at a predetermined time, communication of transmitting the control signal.

(11)

The photodetection apparatus according to any one of (1) to (10) above, further including:

an address control circuit that executes address conversion processing of changing a virtual address of the corresponding neuron group to newly specifically associate the pixel group with the neuron group in response to receiving a content of a change in the pixel group transmitted from the image sensor in a case where the pixel group is changed, the content of the change being included in the communication.

(12)

The photodetection apparatus according to (11) above, in which, when executing the address conversion processing, the address control circuit realizes the change in the pixel group by referencing a pre-held address table to replace the address.

(13)

The photodetection apparatus according to any one of (1) to (12) above, in which, at an interface between a semiconductor substrate on which the image sensor is provided and a semiconductor substrate on which the processor is provided, pieces of wiring are stacked by Cu—Cu bonding, and the group interface is arranged on the processor side of the interface.

(14)

The photodetection apparatus according to any one of (1) to (13) above, in which a neural network circuit different from the processor is connected to an outside of the photodetection apparatus, both the processor and the neural network circuit different from the processor communicate with each other, and both the image sensor and the neural network circuit different from the processor communicate with each other.

(15)

The photodetection apparatus according to (5) above, in which, when the region-of-interest is output from the image sensor and input to the processor, the processor performs an operation of recognizing the subject appearing in the region-of-interest, and notifies the image sensor of the region-of-interest at a next time according to a result of the operation to change the region-of-interest to be output by the image sensor at the next time.

(16)

Electronic equipment including:

an image sensor provided with a pixel group including N (N is a positive integer) pixels from among a plurality of pixels arranged on a sensor surface in an array;

a processor in which a neural network is formed by a neuron group with M (M is a positive integer) neurons; and a group interface provided between the pixel group and the neuron group and performing bidirectional communication between the image sensor and the processor.

Note that the present embodiment is not limited to the embodiment described above and can be varied without departing from the spirits of the present disclosure. In addition, the effects described herein are only illustrative and not restrictive, and any other effect may be produced.

REFERENCE SIGNS LIST

11: Solid-state imaging device
12: Image sensor
13: Neural network processor
21: Pixel
22: Pixel group
31: Group IF
32: Accumulation section
33: Multiply and accumulate unit
34: Memory
35: LI unit
36: Firing unit
37: Neuron control unit
38: Learning unit
39: Neuron group
40: Input/output IF
41: Input buffer
42: Learning memory
51: Pixel array section
52: Pixel control section
53: Pixel output control section
54: Input/output IF
61: Neural network circuit
62: Predicted pixel
63: Pixel conversion circuit 64: Convolution layer
65: A plurality of group IFs
66: Group neuron
67: Fully contact layer
68: Down sample layer
71: Address control circuit
72: Storage section
73: Virtual address table
91: Neural network circuit for postprocessing

The invention claimed is:

1. A photodetection apparatus comprising:

an image sensor provided with a pixel group including N (N is a positive integer) pixels from among a plurality of pixels arranged on a sensor surface in an array;

a processor in which a neural network is formed by a neuron group with M (M is a positive integer) neurons;

a group interface provided between the pixel group and the neuron group and performing bidirectional communication between the image sensor and the processor;

circuitry configured to use a processing result of processing executed in the neural network to control properties of the pixel, for each of the neurons in the neuron group, in a case where intermediate data determined by each of the neurons exceeds a predetermined threshold, detect firing of the neuron for which the intermediate data exceeds the threshold, and determine a learning signal based on a firing rate of the neuron detected; and a memory that accumulates the learning signal output over time, wherein a value obtained by accumulating the learning signal in the memory is fed to the circuitry as a control signal and used to control the properties of the pixel.

2. The photodetection apparatus according to claim 1, wherein the circuitry is configured to adjust any one or more of a gain, a delay, and a noise in a pixel signal output from the pixel and an unresponsive period of the pixel signal.

3. The photodetection apparatus according to claim 1, wherein the neural network executes processing of detecting a pixel signal with a fixed, temporally periodic pattern acquired by the image sensor.

4. The photodetection apparatus according to claim 1, wherein the circuitry is configured to determine or change a region-of-interest in which a subject of interest appears in an image captured by the image sensor, and set the pixels other than those in the region-of-interest into a standby state.

5. The photodetection apparatus according to claim 1, wherein the circuitry is configured to perform:

a differential of the firing rate of the neuron or an operation corresponding to the differential and feeds a result of the operation to the firing detection section.

6. The photodetection apparatus according to claim 5, wherein the circuitry is configured to perform the operation corresponding to the differential by use of at least any one of a leaky integrate value of the number of firings of the neuron and a membrane potential of the neuron.

7. The photodetection apparatus according to claim 5, wherein the circuitry is configured to use the operation corresponding to the differential to determine a time moving rate of the firing rate that is a differential, in a spatial direction, of a spatial distribution of firing rates of the neurons.

8. The photodetection apparatus according to claim 1, wherein the group interface accumulates the learning signal in the learning memory and performs, at a predetermined time, communication of transmitting the control signal.

9. The photodetection apparatus according to claim 1, the circuitry is configured to address conversion processing of changing a virtual address of the corresponding neuron group to newly specifically associate the pixel group with the neuron group in response to receiving a content of a change in the pixel group transmitted from the image sensor in a case where the pixel group is changed, the content of the change being included in the communication.

10. The photodetection apparatus according to claim 9, wherein, when executing the address conversion processing, the circuitry is configured to realize the change in the pixel group by referencing a pre-held address table to replace the address.

11. The photodetection apparatus according to claim 1, wherein, at an interface between a semiconductor substrate on which the image sensor is provided and a semiconductor substrate on which the processor is provided, pieces of wiring are stacked by Cu—Cu bonding, and the group interface is arranged on the processor side of the interface.

12. The photodetection apparatus according to claim 11, wherein a neural network circuit different from the processor is connected to an outside of the photodetection apparatus, both the processor and the neural network circuit different from the processor communicate with each other, and both the image sensor and the neural network circuit different from the processor communicate with each other.

13. The photodetection apparatus according to claim 4, wherein, when the region-of-interest is output from the image sensor and input to the processor, the processor performs an operation of recognizing the subject appearing in the region-of-interest, and notifies the image sensor of the region-of-interest at a next time according to a result of the operation to change the region-of-interest to be output by the image sensor at the next time.

14. The photodetection apparatus according to claim 1, wherein the circuitry is configured to predict pixels requiring state transition at a next time based on the differential of frequency of the firing rate and preliminarily prepare the pixels for which driving is started at the next time.

15. The photodetection apparatus according to claim 1, wherein the processor is configured to perform a multiply and accumulate operation between data fed via the group interface and weights stored in the memory.

16. The photodetection apparatus according to claim 1, wherein the circuitry is configured to transmit a control signal to the image sensor to adjust a signal amount to prevent a wait to access the memory in the processor.

17. The photodetection apparatus according to claim 11, wherein the processor and the image sensor communicate bidirectionally via the group interface arranged on the semiconductor substrate on which the processor is provided to achieve an increase in efficiency of power consumption.

18. The photodetection apparatus according to claim 1, wherein the circuitry is further configured to unroll a plurality of the neurons in a time direction to acquire and accumulate values of learning information at every time step.

19. The photodetection apparatus according to claim 1, wherein the circuitry is further configured to replace the determined learning signal with a firing rate and use the firing rate to pre-drive the pixels in a high firing region at a next time.

20. Electronic equipment comprising:

an image sensor provided with a pixel group including N (N is a positive integer) pixels from among a plurality of pixels arranged on a sensor surface in an array;

a processor in which a neural network is formed by a neuron group with M (M is a positive integer) neurons;

a group interface provided between the pixel group and the neuron group and performing bidirectional communication between the image sensor and the processor; and an address control circuit that executes address conversion processing of changing a virtual address of the corresponding neuron group to newly specifically associate the pixel group with the neuron group in response to receiving a content of a change in the pixel group transmitted from the image sensor in a case where the pixel group is changed the content of the change being included in the communication.

\* \* \* \* \*